(12) United States Patent
Fukushige et al.

(10) Patent No.: US 6,622,122 B1
(45) Date of Patent: Sep. 16, 2003

(54) DOCUMENT RETRIEVING APPARATUS AND DOCUMENT RETRIEVING METHOD

(75) Inventors: Yoshio Fukushige, Fujisawa (JP); Hiroyuki Suzuki, Kawasaki (JP); Naohiko Noguchi, Yokohama (JP); Hayashi Ito, Matsudo (JP); Mitsuhiro Sato, Atsugi (JP); Masaki Kiyono, Kamakura (JP); Hideki Yasukawa, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/512,214

(22) Filed: Feb. 24, 2000

(30) Foreign Application Priority Data

Mar. 25, 1999 (JP) .......................................... 11-081120

(51) Int. Cl.[7] .......................... G06F 17/27; G10L 15/18
(52) U.S. Cl. .......................... 704/257; 704/9; 704/270; 704/275; 707/4
(58) Field of Search ................................. 704/251, 252, 704/253, 270.1, 270, 231, 257, 9, 275; 707/3, 6, 104.1

(56) References Cited

U.S. PATENT DOCUMENTS

| | | | | |
|---|---|---|---|---|
| 5,526,259 A | | 6/1996 | Kaji | |
| 6,233,559 B1 | * | 5/2001 | Balakrishnan | 704/275 |
| 6,311,182 B1 | * | 10/2001 | Colbath et al. | 379/900 |
| 6,324,512 B1 | * | 11/2001 | Junqua et al. | 704/275 |

FOREIGN PATENT DOCUMENTS

JP          10-49187          2/1998

* cited by examiner

Primary Examiner—David D. Knepper
Assistant Examiner—Abul K. Azad
(74) Attorney, Agent, or Firm—Louis Woo

(57) ABSTRACT

In a document retrieving apparatus, an audio input section converts a sound into a character pattern. A language model storing section stores likelihood information. A word choosing section obtains a word selection result based on the likelihood information. A retrieval condition producing section produces retrieval conditions based on the word selection result. A document storing section stores document to be retrieved. And, a document retrieving section retrieves the documents based on the retrieval conditions. An effective document search can be performed regardless of the sentence recognition accuracy without requiring higher cost in collecting the required language data.

16 Claims, 35 Drawing Sheets

| LISTED WORD | FREQUENTLY COOCCURRING WORDS |
|---|---|
| SAN'IN *(San-in area)* | TOTTORI SAKYU *(Tottori sand hill)* <br> IZUMO TAISHA *(Izumo grand shrine)* <br> SHINJIKO *(Shinji lake)* |
| SANNIN *(three persons)* | |
| RYOKOO *(travel)* | SHUKUHAKU *(accommodations)* <br> TSUAA *(tour)* |
| IZUMO TAISHA *(Izumo grand shrine)* | ENMUSUBI *(Wedding)* |
| - <br> - <br> - | - <br> - <br> - |

FIG. 6

(601) CLIENT :

"SAN'IN E RYOKOO SHITAIN DESUGA"
(I want to travel to San-in area)

(602) OPERATOR :

"SAN'IN E GORYOKOO DESUNE"
(Do you like San-in, ser ?)

(603) CLIENT :

"HAI IZUMO TAISHA NI ITTE MITAI DESU"
(Yes, I want to visit Izumo grand shrine)

(604) OPERATOR :

"IZUMO TAISHA DESUNE"
(Izumo ground shrine, ser ?)

(605) CLIENT :

"ATO ONSEN NIMO HAIRITAI DESU"
(I like spa, too)

(606) OPERATOR :

"SOREDEWA IZUMO TAISHA TO TAMATSUKURI ONSEN ENO TABI TOIU TSUAA WA IKAGA DESUKA"
(OK, how about a tour of "Travel to Izumo ground shrine & Tamatsukuri spa" ?)

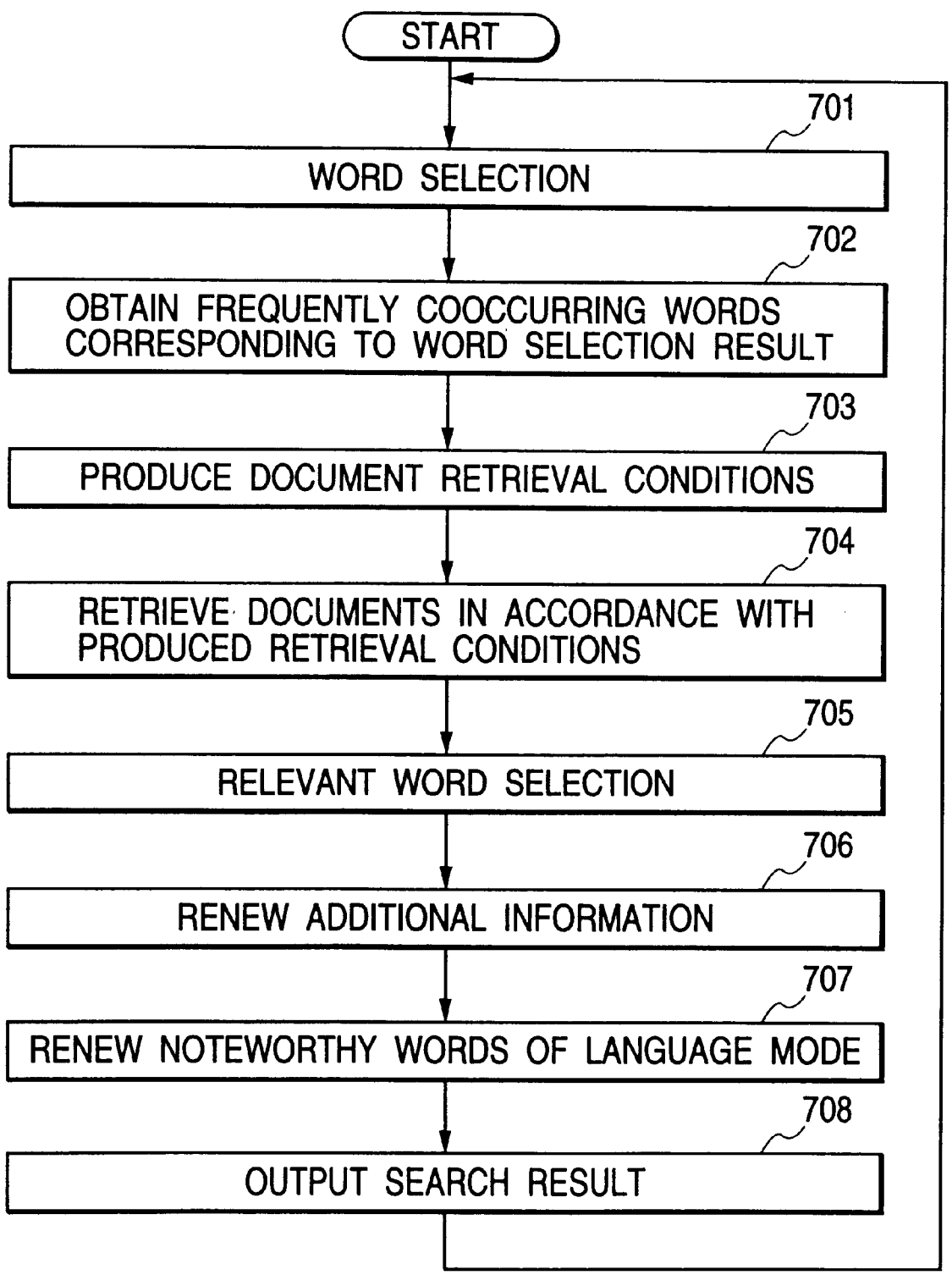

FIG. 9

OPERATOR:          602

"SAN'IN E GORYOKOO DESUNE" *(Do you like San-in, ser ?)*

RECOGNIZED PHONEMIC STRING: 902 san'inegoryokoodesne

WORD SELECTION RESULT
(BEFORE ADJUSTMENT):      903

SAN'IN *(San-in area)*      RYOKOO *(travel)*

SANNIN *(three persons)*

NOTEWORTHY WORDS: 904

WORD SELECTION RESULT
(AFTER ADJUSTMENT):      905

SAN'IN *(San-in area)*      RYOKOO *(travel)*

SANNIN *(three persons)*

FIG. 10

| SELECTED WORDS | SAN'IN *(San-in area)*, RYOKOO *(travel)*, SANNIN *(three persons)* | ~905 |
|---|---|---|
| RESULTANT HIGHLY RELEVANT WORDS | | ~1001 |
| LOW RELEVANT WORDS SELECTED FROM PREVIOUS NOTEWORTHY WORDS | | ~1002 |
| FREQUENTLY COOCCURRING WORDS CORRESPONDING TO SELECTED WORDS | SAN'IN *(San-in area)* - TOTTORI SAKYU *(Tottori sand hill)*, IZUMO TAISHA *(Izumo grand shrine)*, SHINJIKO *(Shinji lake)* <br><br> RYOKOO *(travel)* - SHUKUHAKU *(accommodations)*, TSUAA *(tour)* | ~1003 |
| NOTEWORTHY WORDS | SAN'IN *(San-in area)*, RYOKOO *(travel)*, SANNIN *(three persons)*, TOTTORI SAKYU *(Tottori sand hill)*, IZUMO TAISHA *(Izumo grand shrine)*, SHINJIKO *(Shinji lake)*, SHUKUHAKU *(accommodations)*, TSUAA *(tour)* | ~904 |

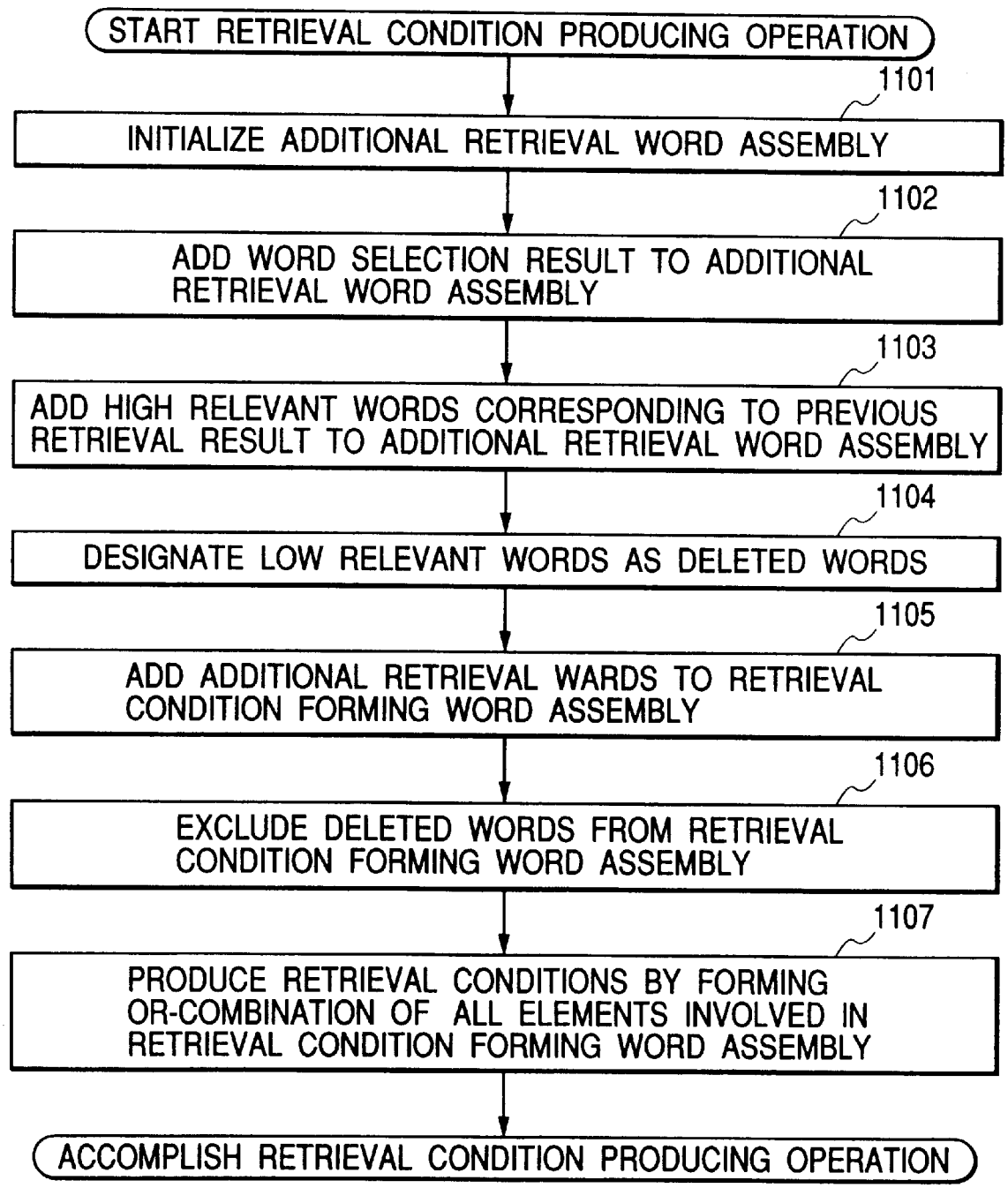

| | | |
|---|---|---|
| PREVIOUS RETRIEVAL CONDITION FORMING WORDS | | ~1201 |
| ADDITIONAL RETRIEVAL WORDS | SAN'IN *(San-in area)*, RYOKOO *(travel)*, SANNIN *(three persons)* | ~1202 |
| DELETED WORDS | | ~1203 |
| NEW RETRIEVAL CONDITION FORMING WORDS | SAN'IN *(San-in area)*, RYOKOO *(travel)*, SANNIN *(three persons)* | ~1204 |
| RETRIEVAL CONDITIONS | "SAN'IN" OR "RYOKOO" OR "SANNIN" | ~1205 |

FIG. 14

| RETRIEVEL CONDITIONS | "SAN'IN" OR "RYOKOO" OR "SANNIN" | | 1205 |
|---|---|---|---|
| RETRIEVED DOCUMENT | TITLE | CATEGORY | |
| | · Travel to San-in--- '98 tour list | tour | 1401 |
| | · Shimane tourism guide (October) | guide | |
| | · Gourmet road----Sain-in | gourmet | |
| | · Three women's travel | tour | |
| | · Tamatsukuri spa | accommodations | |
| HIGH RELEVANT WORDS SELECTED | ONSEN*(spa)*, SOBA*(buckwheat noodle)* | | 1402 |
| NOTEWORTHY WORDS | SAN'IN*(San-in area)*, RYOKOO*(travel)*, SANNIN*(three persons)*, TOTTORI SAKYU*(Tottori sand hill)*, IZUMO TAISHA*(Izumo grand shrine)*, SHINJIKO*(Shinji lake)*, SHUKUHAKU*(accommodations)*, TSUAA*(tour)* | | 904 |
| LOW RELEVANT WORDS IN NOTEWORTHY WORDS | SANNIN*(three persons)* | | 1403 |

FIG. 15

(START ADDITIONAL INFORMATION RENEWING OPERATION)

↓ 1501

ADD HIGH RELEVANT WORDS RESULTANT FROM DOCUMENT SEARCH TO NOTEWORTHY WORD ASSEMBLY

↓ 1502

EXCLUDE LOW RELEVANT WORDS RESULTANT FROM DOCUMENT SEARCH FROM NOTEWORTHY WORD ASSEMBLY

↓

(ACCOMPLISH ADDITIONAL INFORMATION RENEWING OPERATION)

FIG. 16

| | | |
|---|---|---|
| SELECTED WORDS | SAN'IN(San-in area), RYOKOO(travel), SANNIN (three persons) | ~905 |
| RESULTANT HIGHLY RELEVANT WORDS | ONSEN(spa), SOBA(buckwheat noodle) | ~1001 |
| LOW RELEVANT WORDS SELECTED FROM PREVIOUS NOTEWORTHY WORDS | SANNIN(three persons) | ~1002 |
| FREQUENTLY COOCCURRING WORDS CORRESPONDING TO SELECTED WORDS | SAN'IN(San-in area)→TOTTORI SAKYU(Tottori sand hill), IZUMO TAISHA(Izumo grand shrine), SHINJIKO (Shinji lake)<br><br>RYOKOO(travel)→SHUKUHAKU(accommodations), TSUAA(tour) | ~1003 |
| NOTEWORTHY WORDS | SAN'IN(San-in area), RYOKOO(travel), TOTTORI SAKYU(Tottori sand hill), IZUMO TAISHA(Izumo grand shrine), SHINJIKO(Shinji lake), SHUKUHAKU (accommodations), TSUAA(tour), ONSEN(spa), SOBA(buckwheat noodle) | ~904 |

FIG. 17

OPERATOR: ⁓604
"IZUMO TAISHA DESUNE" *(Izumo ground shrine, ser ?)*

RECOGNIZED PHONEMIC STRING: ⁓902
izumotaishadesne

WORD SELECTION RESULT
(BEFORE ADJUSTMENT): ⁓903
IZUMO TAISHA*(Izumo ground shrine)*
IZU*(Izu peninsula)* KAISHA*(corporation)*

NOTEWORTHY WORDS: ⁓904
SAN'IN*(San-in area)*, RYOKOO*(travel)*, TOTTORI SAKYU*(Tottori sand hill)*, IZUMO TAISHA*(Izumo grand shrine)*, SHINJIKO*(Shinji lake)*, SHUKUHAKU *(accommodations)*, TSUAA*(tour)*, ONSEN*(spa)*, SOBA*(buckwheat noodle)*

WORD SELECTION RESULT
(AFTER ADJUSTMENT): ⁓905
IZUMO TAISHA*(Izumo grand shrine)*

FIG. 18

| | | |
|---|---|---|
| SELECTED WORDS | IZUMO TAISHA *(Izumo grand shrine)* | ~905 |
| RESULTANT HIGHLY RELEVANT WORDS | ONSEN *(spa)*, SOBA *(buckwheat noodle)* | ~1001 |
| LOW RELEVANT WORDS SELECTED FROM PREVIOUS NOTEWORTHY WORDS | SANNIN *(three persons)* | ~1002 |
| FREQUENTLY COOCCURRING WORDS CORRESPONDING TO SELECTED WORDS | IZUMO TAISHA *(Izumo grand shrine)*→ENMUSUBI *(wedding)* | ~1003 |
| NOTEWORTHY WORDS | SAN'IN *(San-in area)*, RYOKOO *(travel)*, TOTTORI SAKYU *(Tottori sand hill)*, IZUMO TAISHA *(Izumo grand shrine)*, SHINJIKO *(Shinji lake)*, SHUKUHAKU *(accommodations)*, TSUAA *(tour)*, ONSEN *(spa)*, SOBA *(buckwheat noodle)*, ENMUSUBI *(wedding)* | ~904 |

FIG. 19

| | | |
|---|---|---|
| PREVIOUS RETRIEVAL CONDITION FORMING WORDS | SAN'IN *(San-in area)*, RYOKOO *(travel)*, SANNIN *(three persons)* | ~1201 |
| ADDITIONAL RETRIEVAL WORDS | IZUMO TAISHA *(Izumo grand shrine)*, ONSEN *(spa)*, SOBA *(buckwheat noodle)* | ~1202 |
| DELETED WORDS | | ~1203 |
| NEW RETRIEVAL CONDITION FORMING WORDS | SAN'IN *(San-in area)*, RYOKOO *(travel)*, IZUMO TAISHA *(Izumo grand shrine)*, ONSEN *(spa)*, SOBA *(buckwheat noodle)* | ~1204 |
| RETRIEVAL CONDITIONS | "SAN'IN" OR "RYOKOO" OR "IZUMO TAISHA" OR "ONSEN" OR "SOBA" | ~1205 |

FIG. 20

| RETRIEVEL CONDITIONS | "SAN'IN" OR "RYOKOO" OR "IZUMO TAISHA" OR "ONSEN" OR "SOBA" | | ~1205 |
|---|---|---|---|
| RETRIEVED DOCUMENT | TITLE | CATEGORY | ~1401 |
| | · Travel to Izumo ground shrine and Tamatsukuri spa | individual tour | |
| | · Izumo ground shrine | guide | |
| | · Fukujyuan | gourmet(Izumo buckwheat noodle) | |
| | · Tamatsukuri spa | accommodations | |
| HIGH RELEVANT WORDS SELECTED | TAISHACHO(Taisha town), TAMATSUKURI ONSEN (Tamatsukuri spa) | | ~1402 |
| NOTEWORTHY WORDS | SAN'IN(San-in area), RYOKOO(travel), TOTTORI SAKYU (Tottori sand hill), IZUMO TAISHA(Izumo grand shrine), SHINJIKO(Shinji lake), SHUKUHAKU(accommodations), TSUAA(tour), ONSEN(spa), SOBA(buckwheat noodle), ENMUSUBI(wedding) | | ~904 |
| LOW RELEVANT WORDS IN NOTEWORTHY WORDS | TOTTORI SAKYU(Tottori sand hill), SHINJIKO(Shinji lake) | | ~1403 |

FIG. 21

| SELECTED WORDS | IZUMO TAISHA *(Izumo grand shrine)* |
|---|---|
| RESULTANT HIGHLY RELEVANT WORDS | TAISHACHO *(Taisha town)*, TAMATSUKURI ONSEN *(Tamatsukuri spa)* |
| LOW RELEVANT WORDS SELECTED FROM PREVIOUS NOTEWORTHY WORDS | TOTTORI SAKYU *(Tottori sand hill)*, SHINJIKO *(Shinji lake)* |
| FREQUENTLY COOCCURRING WORDS CORRESPONDING TO SELECTED WORDS | IZUMO TAISHA *(Izumo grand shrine)* - ENMUSUBI *(wedding)* |
| NOTEWORTHY WORDS | SAN'IN *(San-in area)*, RYOKOO *(travel)*, IZUMO TAISHA *(Izumo grand shrine)*, SHUKUHAKU *(accommodations)*, TSUAA *(tour)*, ONSEN *(spa)*, SOBA *(buckwheat noodle)*, ENMUSUBI *(wedding)*, TAISHACHO *(Taisha town)*, "TAMATSUKURI ONSEN" *(Tamatsukuri spa)* |

FIG. 22

OPERATOR: 606

"SOREDEWA IZUMO TAISHA TO TAMATSUKURI ONSEN ENO TABI TOIU TSUAA WA IKAGA DESUKA"
(OK, how about a tour of "Travel to Izumo ground shrine & Tamatsukuri spa" ?)

RECOGNIZED PHONEMIC STRING: 902 soredewaizumotaishatotamatskuronsenenotabitoyuutsuaawaikagadeska

WORD SELECTION RESULT
(BEFORE ADJUSTMENT): 903

| IZUMO TAISHA | TAMATSUKURI ONSEN | TABI | TSUAA |
| (Izumo ground shrine) | (Tamatsukuri spa) | (travel) | (tour) |
| AIZU  KAISHA | TAMA  ONSEN | | |
| (Aizu area) (corporation) | (Tama district) (spa) | | |
| IZU | MATSURI | | |
| (Izu peninsula) | (festival) | | |

NOTEWORTHY WORDS: 904

SAN'IN(San-in area), RYOKOO(travel), IZUMO TAISHA(Izumo grand shrine), SHUKUHAKU(accommodations), TSUAA(tour), ONSEN(spa), SOBA(buckwheat noodle), ENMUSUBI(wedding), TAISHACHO(Taisha town), TAMATSUKURI ONSEN(Tamatsukuri spa)

WORD SELECTION RESULT
(AFTER ADJUSTMENT): 905

| IZUMO TAISHA | TAMATSUKURI ONSEN | TABI | TSUAA |
| (Izumo grand shrine) | (Tamatsukuri spa) | (travel) | (tour) |

FIG. 26

CLIENT:        601

"SAN'IN E RYOKOO SHITAIN DESUGA"
*(I want to travel to San-in area)*

RECOGNIZED PHONEMIC STRING:    902a sannninderyokooshitaiindesuga

WORD SELECTION RESULT
(BEFORE ADJUSTMENT):        903a

SANNIN *(three persons)*    RYOKOO *(travel)*    IIN *(doctor's office)*

SAN'IN *(San-in area)*

NOTEWORTHY WORDS:      904a

WORD SELECTION RESULT
(AFTER ADJUSTMENT):        905a

SANNIN *(three persons)*    RYOKOO *(travel)*    IIN *(doctor's office)*

SAN'IN *(San-in area)*

FIG. 27

OPERATOR :    602

"SAN'IN E GORYOKOO DESUNE"
*(Do you like San-in, ser ?)*

RECOGNIZED PHONEMIC STRING :   902b san'inegoryokoodesne

WORD SELECTION RESULT
(BEFORE ADJUSTMENT) :   903b

SAN'IN *(San-in area)*     RYOKOO *(travel)*

SANNIN *(three persons)*

NOTEWORTHY WORDS :   904b

WORD SELECTION RESULT
(AFTER ADJUSTMENT) :   905b

SAN'IN *(San-in area)*     RYOKOO *(travel)*

SANNIN *(three persons)*

FIG. 29

| WORDS OBTAINED FROM CLIENT'S UTTERANCE 601 (1ST WORD SELECTION RESULT) | SANNIN*(three persons)*, RYOKOO*(travel)*, IIN*(doctor's office)*, SAN'IN *(San-in area)* | ~905a |
|---|---|---|
| WORDS OBTAINED FROM OPERATOR'S UTTERANCE 602 (2ND WORD SELECTION RESULT) | SAN'IN*(San-in area)*, RYOKOO*(travel)*, SANNIN*(three persons)* | ~905b |
| CHOSEN WORDS AS COMPARISON RESULT | SAN'IN*(San-in area)*, RYOKOO*(travel)* | ~2901 |

FIG. 30

| SELECTED WORDS | SAN'IN*(San-in area)*, RYOKOO*(travel)* | ~2901 |
|---|---|---|
| RESULTANT HIGHLY RELEVANT WORDS | | ~1001 |
| LOW RELEVANT WORDS SELECTED FROM PREVIOUS NOTEWORTHY WORDS | | ~1002 |
| FREQUENTLY COOCCURRING WORDS CORRESPONDING TO SELECTED WORDS | SAN'IN*(San-in area)*→TOTTORI SAKYU*(Tottori sand hill)*, IZUMO TAISHA*(Izumo grand shrine)*, SHINJIKO *(Shinji lake)*<br><br>RYOKOO*(travel)*→SHUKUHAKU*(accommodations)*, TSUAA*(tour)* | ~1003 |
| NOTEWORTHY WORDS | SAN'IN*(San-in area)*, RYOKOO*(travel)*, TOTTORI SAKYU*(Tottori sand hill)*, IZUMO TAISHA*(Izumo grand shrine)*, SHINJIKO*(Shinji lake)*, SHUKUHAKU *(accommodations)*, TSUAA*(tour)* | ~904 |

FIG. 31

| | | |
|---|---|---|
| PREVIOUS RETRIEVAL CONDITION FORMING WORDS | | ~1201 |
| ADDITIONAL RETRIEVAL WORDS | SAN'IN *(San-in area)*, RYOKOO *(travel)* | ~1202 |
| DELETED WORDS | | ~1203 |
| NEW RETRIEVAL CONDITION FORMING WORDS | SAN'IN *(San-in area)*, RYOKOO *(travel)* | ~1204 |
| RETRIEVAL CONDITIONS | "SAN'IN" OR "RYOKOO" | ~1205 |

FIG. 32

| | | | |
|---|---|---|---|
| RETRIEVEL CONDITIONS | "SAN'IN" OR "RYOKOO" | | ~1205 |
| RETRIEVED DOCUMENT | TITLE | CATEGORY | ~1401 |
| | · Travel to San-in--- '98 tour list<br>· Shimane tourism guide (October)<br>· Gourmet road----Sain-in<br>· Three women's travel<br>· Tamatsukuri spa | tour<br>guide<br>gourmet<br>tour<br>accommodations | |
| HIGH RELEVANT WORDS SELECTED | ONSEN *(spa)*, SOBA *(buckwheat noodle)* | | ~1402 |
| NOTEWORTHY WORDS | SAN'IN *(San-in area)*, RYOKOO *(travel)*, SANNIN *(three persons)*, TOTTORI SAKYU *(Tottori sand hill)*, IZUMO TAISHA *(Izumo grand shrine)*, SHINJIKO *(Shinji lake)*, SHUKUHAKU *(accommodations)*, TSUAA *(tour)* | | ~904 |
| LOW RELEVANT WORDS IN NOTEWORTHY WORDS | | | ~1403 |

FIG. 33

| SELECTED WORDS | SAN'IN *(San-in area)*, RYOKOO *(travel)* | ~905 |
|---|---|---|
| RESULTANT HIGHLY RELEVANT WORDS | ONSEN *(spa)*, SOBA *(buckwheat)* | ~1001 |
| LOW RELEVANT WORDS SELECTED FROM PREVIOUS NOTEWORTHY WORDS | | ~1002 |
| FREQUENTLY COOCCURRING WORDS CORRESPONDING TO SELECTED WORDS | SAN'IN *(San-in area)*→TOTTORI SAKYU *(Tottori sand hill)*, IZUMO TAISHA *(Izumo grand shrine)*, SHINJIKO *(Shinji lake)*<br><br>RYOKOO *(travel)*→SHUKUHAKU *(accommodations)*, TSUAA *(tour)* | ~1003 |
| NOTEWORTHY WORDS | SAN'IN *(San-in area)*, RYOKOO *(travel)*, TOTTORI SAKYU *(Tottori sand hill)*, IZUMO TAISHA *(Izumo grand shrine)*, SHINJIKO *(Shinji lake)*, SHUKUHAKU *(accommodations)*, TSUAA *(tour)*, ONSEN *(spa)*, SOBA *(buckwheat)* | ~904 |

FIG. 34

CLIENT:        603

"HAI IZUMO TAISHA NI ITTE MITAI DESU"
*(Yes, I want to visit Izumo grand shrine)*

RECOGNIZED PHONEMIC STRING:   902a aizunokaishanitemitaides

WORD SELECTION RESULT
(BEFORE ADJUSTMENT):   903a

AIZU           KAISHA         TAI
*(Aizu area)*    *(corporation)*    *(sea bream)*

IZU
*(Izu peninsula)*

IZUMO TAISHA
*(Izumo grand shrine)*

NOTEWORTHY WORDS:   904a

SAN'IN*(San-in area)*, RYOKOO*(travel)*, TOTTORI SAKYUU*(Tottori sand hill)*, IZUMO TAISHA*(Izumo grand shrine)*, SHINJIKO*(Shinji lake)*, SHUKUHAKU *(accommodations)*, TSUAA*(tour)*, ONSEN*(spa)*, SOBA*(buckwheat noodle)*, WORD SELECTION RESULT
(AFTER ADJUSTMENT):   905a IZUMO TAISHA      TAI
*(Izumo grand shrine)*   *(sea bream)*

*FIG. 35*

OPERATOR: ~604
"IZUMO TAISHA DESUNE"
(Izumo ground shrine, ser ?)

RECOGNIZED PHONEMIC STRING: ~902b
izumotaishadesne

WORD SELECTION RESULT
(BEFORE ADJUSTMENT): ~903b

IZUMO TAISHA
(Izumo ground shrine)

IZU          KAISHA
(Izu peninsula)  (corporation)

NOTEWORTHY WORDS: ~904b

SAN'IN *(San-in area)*, RYOKOO *(travel)*, TOTTORI SAKYU *(Tottori sand hill)*,
IZUMO TAISHA *(Izumo grand shrine)*, SHINJIKO *(Shinji lake)*, SHUKUHAKU
*(accommodations)*, TSUAA *(tour)*, ONSEN *(spa)*, SOBA *(buckwheat noodle)*, WORD SELECTION RESULT
(AFTER ADJUSTMENT): ~905b IZUMO TAISHA
(Izumo grand shrine)

FIG. 36

| WORDS OBTAINED FROM CLIENT'S UTTERANCE 603 (1ST WORD SELECTION RESULT) | IZUMO TAISHA (Izumo grand shrine), TAI (sea bream) | ~905a |
| --- | --- | --- |
| WORDS OBTAINED FROM OPERATOR'S UTTERANCE 604 (2ND WORD SELECTION RESULT) | IZUMO TAISHA (Izumo grand shrine) | ~905b |
| CHOSEN WORDS AS COMPARISON RESULT | IZUMO TAISHA (Izumo grand shrine) | ~2901 |

FIG. 37

| SELECTED WORDS | IZUMO TAISHA (Izumo grand shrine) | ~2901 |
| --- | --- | --- |
| RESULTANT HIGHLY RELEVANT WORDS | ONSEN (spa), SOBA (buckwheat noodle) | ~1001 |
| LOW RELEVANT WORDS SELECTED FROM PREVIOUS NOTEWORTHY WORDS | | ~1002 |
| FREQUENTLY COOCCURRING WORDS CORRESPONDING TO SELECTED WORDS | IZUMO TAISHA (Izumo grand shrine)→ENMUSUBI (wedding) | ~1003 |
| NOTEWORTHY WORDS | SAN'IN (San-in area), RYOKOO (travel), TOTTORI SAKYU (Tottori sand hill), IZUMO TAISHA (Izumo grand shrine), SHINJIKO (Shinji lake), SHUKUHAKU (accommodations), TSUAA (tour), ONSEN (spa), SOBA (buckwheat noodle), ENMUSUBI (wedding) | ~904 |

FIG. 38

| | | |
|---|---|---|
| PREVIOUS RETRIEVAL CONDITION FORMING WORDS | SAN'IN *(San-in area)*, RYOKOO *(travel)* | ~1201 |
| ADDITIONAL RETRIEVAL WORDS | IZUMO TAISHA *(Izumo grand shrine)*, ONSEN *(spa)*, SOBA *(buckwheat noodle)* | ~1202 |
| DELETED WORDS | | ~1203 |
| NEW RETRIEVAL CONDITION FORMING WORDS | SAN'IN *(San-in area)*, RYOKOO *(travel)*, IZUMO TAISHA *(Izumo grand shrine)*, ONSEN *(spa)*, SOBA *(buckwheat noodle)* | ~1204 |
| RETRIEVAL CONDITIONS | "SAN'IN" OR "RYOKOO" OR "IZUMO TAISHA" OR "ONSEN" OR "SOBA" | ~1205 |

FIG. 39

| | | | |
|---|---|---|---|
| RETRIEVEL CONDITIONS | "SAN'IN" OR "RYOKOO" OR "IZUMO TAISHA" OR "ONSEN" OR "SOBA" | | ~1205 |
| RETRIEVED DOCUMENT | TITLE | CATEGORY | |
| | · Travel to Izumo ground shrine and Tamatsukuri spa | individual tour | ~1401 |
| | · Izumo ground shrine | guide | |
| | · Fukujyuan | gourmet (Izumo buckwheat noodle) | |
| | · Tamatsukuri spa | accommodations | |
| HIGH RELEVANT WORDS SELECTED | TAISHACHO *(Taisha town)*, TAMATSUKURI ONSEN *(Tamatsukuri spa)* | | ~1402 |
| NOTEWORTHY WORDS | SAN'IN *(San-in area)*, RYOKOO *(travel)*, TOTTORI SAKYU *(Tottori sand hill)*, IZUMO TAISHA *(Izumo grand shrine)*, SHINJIKO *(Shinji lake)*, SHUKUHAKU *(accommodations)*, TSUAA *(tour)*, ONSEN *(spa)*, SOBA *(buckwheat)*, ENMUSUBI *(wedding)* | | ~904 |
| LOW RELEVANT WORDS IN NOTEWORTHY WORDS | TOTTORI SAKYU *(Tottori sand hill)*, SHINJIKO *(Shinji lake)* | | ~1403 |

FIG. 40

| SELECTED WORDS | IZUMO TAISHA (Izumo grand shrine) | ~905 |
|---|---|---|
| RESULTANT HIGHLY RELEVANT WORDS | TAISHACHO (Taisha town), TAMATSUKURI ONSEN (Tamatsukuri spa) | ~1001 |
| LOW RELEVANT WORDS SELECTED FROM PREVIOUS NOTEWORTHY WORDS | TOTTORI SAKYU (Tottori sand hill), SHINJIKO (Shinji lake) | ~1002 |
| FREQUENTLY COOCCURRING WORDS CORRESPONDING TO SELECTED WORDS | IZUMO TAISHA (Izumo grand shrine)→ENMUSUBI (wedding) | ~1003 |
| NOTEWORTHY WORDS | SAN'IN (San-in area), RYOKOO (travel), IZUMO TAISHA (Izumo grand shrine), SHUKUHAKU (accommodations), TSUAA (tour), ONSEN (spa), SOBA (buckwheat noodle), ENMUSUBI (wedding), TAISHACHO (Taisha town), TAMATSUKURI ONSEN (Tamatsukuri spa) | ~904 |

FIG. 41

CLIENT: 605

"ATO ONSEN NIMO HAIRITAI DESU"
(I like spa, too)

RECOGNIZED PHONEMIC STRING: 902a atonseinaimitaides

WORD SELECTION RESULT (BEFORE ADJUSTMENT): 903a

ONSEI (voice)   TAI (sea bream)

ONSEN (spa)

NOTEWORTHY WORDS: 904a

SAN'IN(San-in area), RYOKOO(travel), IZUMO TAISHA(Izumo grand shrine), SHUKUHAKU(accommodations), TSUAA(tour), ONSEN(spa), SOBA(buckwheat noodle), ENMUSUBI(wedding), TAISHACHO(Taisha town), TAMATSUKURI ONSEN(Tamatsukuri spa)

WORD SELECTION RESULT (AFTER ADJUSTMENT): 905a

ONSEN (spa)

FIG. 42

OPERATOR: 606

"SOREDEWA IZUMO TAISHA TO TAMATSUKURI ONSEN ENO TABI TOIU TSUAA WA IKAGA DESUKA"
(OK, how about a tour of "Travel to Izumo ground shrine & Tamatsukuri spa"?)

RECOGNIZED PHONEMIC STRING: 902b soredewaizumotaishatotamatskuronsenenotabitoyuutsuaawaikagadeska WORD SELECTION RESULT
(BEFORE ADJUSTMENT): 903b

| IZUMO TAISHA | TAMATSUKURI ONSEN | TABI | TSUAA |
|---|---|---|---|
| (Izumo ground shrine) | (Tamatsukuri spa) | (travel) | (tour) |
| AIZU  KAISHA | TAMA | ONSEN | |
| (Aizu area) (corporation) | (Tama district) | (spa) | |
| IZU | MATSURI | | |
| (Izu peninsula) | (festival) | | |

NOTEWORTHY WORDS: 904b

SAN'IN(San-in area), RYOKOO(travel), IZUMO TAISHA(Izumo grand shrine), SHUKUHAKU(accommodations), TSUAA(tour), ONSEN(spa), SOBA(buckwheat noodle), ENMUSUBI(wedding), TAISHACHO(Taisha town), TAMATSUKURI ONSEN(Tamatsukuri spa)

WORD SELECTION RESULT
(AFTER ADJUSTMENT): 905b

| IZUMO TAISHA | TAMATSUKURI ONSEN | TABI | TSUAA |
|---|---|---|---|
| (Izumo grand shrine) | (Tamatsukuri spa) | (travel) | (tour) |
| ONSEN | | | |
| (spa) | | | |

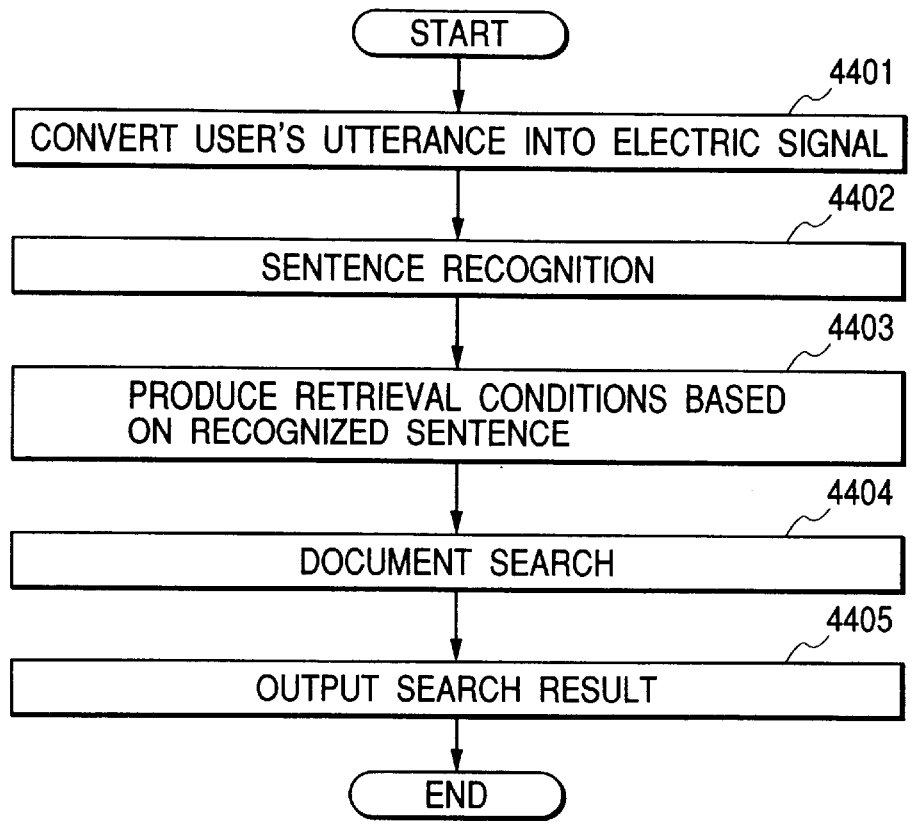

FIG. 44 PRIOR ART

START → 4401 CONVERT USER'S UTTERANCE INTO ELECTRIC SIGNAL → 4402 SENTENCE RECOGNITION → 4403 PRODUCE RETRIEVAL CONDITIONS BASED ON RECOGNIZED SENTENCE → 4404 DOCUMENT SEARCH → 4405 OUTPUT SEARCH RESULT → END

FIG. 45 PRIOR ART

USER:
"SAN-IN E RYOKOO SHITAIN DESUGA"
(I want to travel to San-in area)

RECOGNIZED PHONEMIC STRING:
sanninderyokooshitaiindesuga

SENTENCE RECOGNITION RESULT:
SANNIN DE RYOKOO SHITA IIN DESUGA
(theee persons) (travel) (doctor's office)
~~SAN'IN~~

DOCUMENT RETRIEVING APPARATUS AND DOCUMENT RETRIEVING METHOD

BACKGROUND OF THE INVENTION

The present invention relates to an apparatus and a method for retrieving document based on voice or the like. More specifically, the present invention provides a document retrieving apparatus and a document retrieving method capable of assuring an effective and reliable document search which is not adversely influenced by the sentence recognition accuracy in the voice-based document retrieving operation.

Conventionally known, as representative voice-based document retrieving apparatus/method, is a document retrieving apparatus/method which combines the voice or speech recognition and the whole sentence retrieval.

FIG. 43 shows a conventional voice-based document retrieving apparatus. The conventional voice-based document retrieving apparatus shown in FIG. 43 comprises an audio input section 4301 which converts a sound or voice, such as a user's utterance, into an electric signal. A sentence recognizing section 4302 receives the electric signal from audio input section 4301 and recognizes the sound as a sentence. A retrieval condition producing section 4303 produces retrieval conditions for retrieving documents based on the sentence recognized by the sentence recognizing section 4302. A document storing section 4304 stores documents to be retrieved. A document retrieving section 4305 retrieves the documents stored in the document storing section 4304 based on the retrieval conditions produced by the retrieval condition producing section 4303. And, an information output section 4306 outputs the document search result having been done by the document retrieving section 4305.

FIG. 44 is a flowchart showing the document retrieving operation performed in the above-described conventional document retrieving apparatus. First, in the flowchart shown in FIG. 44, the audio input section 4301 converts the user's utterance into an electric signal (step 4401).

Next, the sentence recognizing section 4302 analyzes the electric signal of the user's voice or speech as a character pattern signal and recognizes a sentence based on the analyzed character patterns (step 4402).

The retrieval condition producing section 4303 produces the retrieval conditions for retrieving documents based on the sentence recognized by the sentence recognizing section 4302 (step 4403).

The document retrieving section 4305 retrieves the documents (i.e., retrieval objects) stored in the document storing section 4304 based on the retrieval conditions produced by the retrieval condition producing section 4303 (step 4404).

The information output section 4306 informs an outside device or person, such as the user, of the document search result having been done by the document retrieving section 4305(step 4405).

As apparent from the foregoing description, the above-described conventional document retrieving apparatus/method recognizes the voice as a sentence, produces the retrieval conditions based on the recognized sentence, and retrieves the documents (i.e., retrieval objects) based on the produced retrieval conditions, thereby accomplishing the voice-based document retrieval operation.

However, the following problem arises in the above-described conventional document retrieving apparatus/method. In general, the voice or speech recognition is subjected to severe input circumstances including uncertainty in user's utterance, performance reliability of voice input device, and inclusion of noises. Thus, there is the possibility that the converted electric signal of the input voice may comprise a strange word (or character) not involved in the original voice or speech but similar to the word (or character) inherently involved in the original voice or speech.

Accordingly, because of inclusion of such strange words not involved in the original voice or speech, the above-described conventional document retrieving apparatus/method may erroneously recognize such strange words as candidate words constituting the sentence corresponding to the input voice or speech. In some cases, this kind of strange or error words have a higher likelihood than the corresponding true or genuine words inherently involved in the original voice or speech.

FIG. 45 is a sample explaining the voice or speech recognition performed by the above-described conventional document retrieving apparatus/method.

In FIG. 45, someone speaks "san-in e ryokyoo shitain desuga", the sound of which is entered into the audio input section 4301. In this case, the audio input section 4301 may erroneously convert the input sound into an electric signal representing a phonemic string of "sanninderyokooshitai-indesuga." Namely, "sannin"/"san'in", "de", "ryokoo", "shita", "iin", and "desuga" are recognized as candidate words for constituting the sentence. Regarding the expression of "sannin"/"san'in", it means that the word "sannin (three persons)" has a higher likelihood than that of the word "san'in (San-in area)." Thus, "sannin" is ranked high.

The above conventional voice-based document retrieving apparatus/method, however, constructs only one sentence based on the recognized candidate words in compliance with its own standards for the sentence recognition. In this case, the actually spoken word "san'in (San-in area)" will be deleted or dropped due to its lower likelihood whereas it is the true or genuine word inherently involved in the original utterance.

According to the example shown in FIG. 45, the sentence "sannin de ryokoo shita iin desuga" is finally recognized. The actually spoken word "san'in (San-in area)" disappeared from the resultant sentence, because the word "san'in (San-in area)" has a lower likelihood than that of the word "sannin (three persons)." Accordingly, "san'in (San-in area)" is no longer involved in the document retrieval conditions produced by the retrieval condition producing section 4303. Instead, the resultant sentence comprises some strange (error) words, such as "sannin (three persons)" and "iin (doctor's office)" etc. Therefore, in the step 4404, the document retrieval operation is improperly performed based on the wrong sentence having a different meaning not corresponding to the original voice or speech.

As described above, there is the problem that the above-described conventional document retrieving apparatus/method possibly deletes or drops the actually spoken word in the sentence recognition and therefore produces wrong retrieval conditions. Thus, it becomes impossible to successfully perform the document retrieval operation.

Furthermore, to realize a highly accurate sentence recognition for the general sentences of natural language, the above conventional voice-based document retrieving apparatus/method requires a huge number of general language data relating to normally used various vocabulary and sentence patterns to perform the sentence recognition with reference to these language data. Thus, the tremendous cost is required for collecting or establishing such a huge language data base.

SUMMARY OF THE INVENTION

In view of the above, the present invention has an object to provide a document retrieving apparatus and a document retrieving method capable of assuring an effective and reliable document search which is not adversely influenced by the sentence recognition accuracy in the voice-based document retrieval operation.

Furthermore, another object of the present invention is to provide a document retrieving apparatus and a document retrieving method capable of suppressing the cost in collecting or establishing a necessary language data base for the voice-based document retrieval operation.

In order to accomplish this and other related objects, a first aspect of the present invention provides a document retrieving apparatus for performing a document search based on sound including voice. The first aspect document retrieving apparatus comprises an audio input means for converting a sound into an electric signal and generating a character pattern data. A language model storing means is provided for storing likelihood information which determines the likelihood of a word recognized from the character pattern data produced from the audio input means. A word choosing means is provided for choosing an estimated word to be involved in the character pattern data produced from the audio input means, as a word selection result based on the likelihood information stored in the language model storing means. A retrieval condition producing means is provided for producing document retrieval conditions based on the word selection result chosen by the word choosing means. A document storing means is provided for storing documents to be retrieved. And, a document retrieving means is provided for retrieving the documents stored in the document storing means based on the document retrieval conditions produced from the retrieval condition producing means.

Furthermore, to accomplish the above objects, the first aspect of the present invention provides a document retrieving method for performing a document search based on sound including voice. The first aspect document retrieving method comprises a step of converting a sound into an electric signal and generating a character pattern data, a step of choosing an estimated word to be involved in the character pattern data, as a word selection result based on likelihood information which determines the likelihood of a word recognized from the character pattern data, a step of producing document retrieval conditions based on the word selection result, and a step of retrieving documents based on the document retrieval conditions.

Accordingly, the document retrieving apparatus and the document retrieving method in accordance with the first aspect of the present invention choose the estimated word to be involved in the original user's utterance when this word has a predetermined likelihood. Hence, as long as the true or genuine word inherently involved in the original voice or speech has a predetermined likelihood, it becomes possible to prevent the estimated word from being deleted or dropped in the sentence recognition even in a case where only one sentence is finally constructed based on the recognized candidate words. Accordingly, the first aspect of the present invention makes it possible to realize an effective and reliable document search without being adversely influenced by the sentence recognition accuracy in the voice-based document retrieval operation. Furthermore, it is not necessary to choose all of the words involved in the user's utterance, because the first aspect of the present invention only requires to constitute a minimum language model in accordance with the document assembly serving as retrieval objects. Thus, the first aspect of the present invention reduces the cost in collecting or establishing the necessary language data base.

Furthermore, in the above-described document retrieving apparatus, it is preferable to further comprise an information output means for outputting search result obtained from the document retrieving means.

With this arrangement, it becomes possible to let the operator know the retrieval result. The retrieval result can be edited in accordance with operator's instructions. The edited retrieval result can be shown to the client and the operator. Accordingly, it becomes possible to realize a highly accurate document search.

Furthermore, to accomplish the above objects, a second aspect of the present invention provides a document retrieving apparatus for performing a document search based on sound including voice. In this second aspect document retrieving apparatus, a first audio input means is provided for converting a first sound into an electric signal and generating a first character pattern data. A first language model storing means is provided for storing likelihood information which determines the likelihood of a word recognized from the first character pattern data produced from the first audio input means. A first word choosing means is provided for choosing an estimated word to be involved in the first character pattern data produced from the first audio input means, as a first word selection result based on the likelihood information stored in the first language model storing means. A second audio input means is provided for converting a second sound into an electric signal and generating a second character pattern data. A second language model storing means is provided for storing likelihood information which determines the likelihood of a word recognized from the second character pattern data produced from the second audio input means. A second word choosing means is provided for choosing an estimated word to be involved in the second character pattern data produced from the second audio input means, as a second word selection result based on the likelihood information stored in the second language model storing means. A word selection result comparing means is provided for comparing the first word selection result chosen by the first word choosing means with the second word selection result chosen by the second word choosing means to produce a new word selection result. A retrieval condition producing means is provided for producing document retrieval conditions based on the new word selection result produced by the word selection result comparing means. A document storing means is provided for storing documents to be retrieved. And, a document retrieving means is provided for retrieving the documents stored in the document storing means based on the document retrieval conditions produced from the retrieval condition producing means.

Furthermore, to accomplish the above objects, the second aspect of the present invention provides a document retrieving method for performing a document search based on sound including voice. The second aspect document retrieving method comprises a step of converting a first sound into an electric signal and generating a first character pattern data, a step of choosing an estimated word to be involved in the first character pattern data, as a first word selection result based on likelihood information which determines the likelihood of a word recognized from the first character pattern data, a step of converting a second sound into an electric signal and generating a second character pattern data, a step of choosing an estimated word to be involved in the second character pattern data, as a second word selection result based on likelihood information which determines the likelihood of a word recognized from the second character pattern data, a step of comparing the first word selection result with the second word selection result to produce a new word selection result, a step of producing document retrieval conditions based on the new word selection result, and a step of retrieving documents based on the document retrieval conditions.

In this manner, two corresponding estimated words are compared. And, the comparison result is used to produce the retrieval conditions. Thus, it becomes possible to realize an effective and reliable document search when two corresponding utterances are cooperatively used in the document search.

For example, in the comparison of the two corresponding estimated words, it may be preferable to increase the likelihood of the estimated word involved in the second utterance than that of the estimated word involved in the first utterance. It may be also preferable to further increase the likelihood of an estimated word if this word is involved in both of the first and second utterances. It may be also preferable to decrease the likelihood of an estimated word if this word is involved in the first utterance but is not involved in the second utterance. In some cases, the second utterance has a role for assisting the document search based on the first utterance. In this respect, the second utterance may include repetition of important words involved in the first utterance. Or, the second utterance may include supplemental words or revised words correcting the uncertainty or unclearness of first utterance. Thus, the second aspect of the present invention makes it possible to use appropriate retrieval conditions compared with the case where only the first utterance is used in the document search. Thus, it becomes possible to surely realize an effective and reliable document search.

Furthermore, in the above-described document retrieving apparatus, it is preferable to further comprise an information output means for outputting retrieval result obtained from the document retrieving means in such a manner that the retrieval result is differently edited for each of a source of the first sound and a source of the second sound.

With this arrangement, it becomes possible to differently edit the retrieval result according to each of the first utterance and the second utterance and to output the edited retrieval result to respective users.

Especially, when the document search based on the first utterance is aided by the second utterance, all of the retrieval result can be output to the second utterance user. On the other hand, the first utterance user can receive the effective retrieval result only which is selected according to the judgement of the second utterance user. In this manner, the first utterance user can selectively receive the effective retrieval result only.

Furthermore, in the above-described document retrieving apparatus, it is preferable that the retrieval condition producing means produces the document retrieval conditions based on all of the new word selection result produced by the word selection result comparing means, the first word selection result chosen by the first word choosing means, and the second word selection result chosen by the second word choosing means.

With this arrangement, it becomes possible to obtain proper retrieval conditions in accordance with the used environment. Thus, the document search can be effectively performed.

Furthermore, in the above-described first aspect document retrieving apparatus, it is preferable to further comprise an additional information administrating means for producing additional information to be added to the word selection result chosen by the word choosing means in accordance with its internal condition, so as to renew the internal condition. In this case, the retrieval condition producing means produces the document retrieval conditions based on both the word selection result chosen by the word choosing means and the additional information produced by the additional information administrating means.

Preferably, the above-described additional information administrating means renews the likelihood information stored in the language model storing means based on the additional information.

Furthermore, in the above-described second aspect document retrieving apparatus, it is preferable to further comprise an additional information administrating means for producing additional information to be added to the new word selection result produced by the word selection result comparing means in accordance with its internal condition, so as to renew the internal condition. In this case, the retrieval condition producing means produces the document retrieval conditions based on both the new word selection result produced by the word selection result comparing means and the additional information produced by the additional information administrating means.

Preferably, the above-described additional information administrating means renews the likelihood information stored in the language model storing means based on the additional information.

In general, the likelihood as to whether a utterance includes a specific word tends to vary according to the context including this utterance. Thus, it becomes possible to increase the word choosing accuracy by reflecting the contextual constraint formed by a series of utterances to the reference information referred to in the word choosing operation. Accordingly, when the document search is repetitively performed based on user's utterances, the above-described additional information administrating means reflects the word selection result to its internal condition. Furthermore, it is possible to reflect the word selection result to the language model which is referred to in the word choosing operation. As a result, the contextual constraint formed by a series of user's utterances can be reflected to the word choosing operation. Thus, it becomes possible to increase the word choosing accuracy. Thus, it becomes possible to realize an effective and reliable voice-based document search.

Furthermore, in the above-described first aspect document retrieving apparatus, it is preferable to further comprise a word-to-word relationship information storing means for storing word-to-word relationship information relating to the relationship established between predetermined words. In this case, the additional information administrating means produces the additional information to be added to the word selection result chosen by the word choosing means based on both the word-to-word relationship information stored in the word-to-word relationship information storing means and the internal condition of the additional information administrating means, so as to renew the internal condition.

Furthermore, in the above-described second aspect document retrieving apparatus, it is preferable to further comprise a word-to-word relationship information storing means for storing word-to-word relationship information relating to the relationship established between predetermined words.

In this case, the additional information administrating means produces the additional information to be added to the new word selection result produced by the word selection result comparing means based on both the word-to-word relationship information stored in the word-to-word relationship information storing means and the internal condition of the additional information administrating means, so as to renew the internal condition.

The likelihood of two specific words appearing in the same utterance, i.e., co-occurrence of two specific words, varies depending on the relationship existing between these specific words. Accordingly, by providing the word-to-word relationship information storing means, it becomes possible to refer to the information relating to the relationship established between the specific words in addition to the internal condition as well as to refer to the word selection result, in the production of the retrieval conditions. Thus, the retrieval conditions can be produced by using the additional information resulting from the word selection result. For example, when a word seldom appears together with another selected word, it is preferable to delete or exclude this strange word from the retrieval conditions. Accordingly, even when any error occurs in the word choosing operation, it becomes possible to surely exclude such erroneous words from the retrieval conditions. Thus, it becomes possible to realize an effective and reliable voice-based document search.

Furthermore, it is possible to refer to the word-to-word relationship to check whether or not a word not involved in the word selection result has any relationship with the word involved in the word selection result. If there is a relationship that the two words tend to appear together, it will be preferable to produce the retrieval conditions so as to include such a word not involved in the word selection result. Or, it will be preferable to produce the retrieval conditions so as to increase the priority order of a resultant document including such a word. This will result in an effective and reliable voice-based document search. On the contrary, as a result of the reference to the word-to-word relationship, it may be concluded that the above two words seldom appear together. In this case, it will be preferable to produce the retrieval conditions so as to exclude the word not involved in the word selection result. Or, it will be preferable to produce the retrieval conditions so as to decrease the priority order of a resultant document including such a word. This will also result in an effective and reliable voice-based document search.

Furthermore, in the above-described document retrieving apparatus, it is preferable to further comprise a relevant word information choosing means for choosing relevant word information of a characteristic word relating to a document group produced as search result from the document retrieving means. In this case, the additional information administrating means renews the internal condition of the additional information administrating means based on the relevant word information chosen by the relevant word information choosing means.

With this arrangement, to realize an effective and reliable document search, it becomes possible to utilize the cooccurring nature of two specific words in producing the retrieval conditions based on the word selection result obtained from user's utterance. Furthermore, in the document search, it becomes possible to choose a characteristic word from the document group produced as search result. The chosen characteristic can be utilized to correct the retrieval conditions so as to increase the retrieval accuracy, or can be utilized to facilitate the search of related documents.

Furthermore, in the above-described document retrieving apparatus, it is preferable that the additional information administrating means renews the internal condition of the additional information administrating means based on both the relevant word information chosen by the relevant word information choosing means and the word-to-word relationship information stored in the word-to-word relationship information storing means.

In the above-described document retrieving apparatus, the characteristic word is chosen from the document group produced as search result obtainable from the user's utterance. It is possible to produce additional information indicating the cooccurring nature between the chosen characteristic word and the word chosen from the user's utterance. The produced additional information is reflected in the renewal of the internal condition. Thus, the chosen characteristic word can be utilized in the production of the retrieval conditions for the retrieval operation based on the succeeding user's utterance. This arrangement is advantageous in that no preparation is required for the knowledge relating to the relationship established between specific words. Thus, without preparing such knowledge, the characteristic word is chosen from the document group produced as search result in the document search. The chosen characteristic can be utilized to correct the retrieval conditions so as to increase the retrieval accuracy, or can be utilized to facilitate the search of related documents.

Furthermore, choosing the cooccurring nature from the retrieved document can be utilized in the following manner. For example, this arrangement is applicable to the information relating to the cooccurring nature only found in a specific field or theme, or to the information relating to the cooccurring nature relevant to the brand-new peculiar noun. Thus, it becomes possible to realize an effective and reliable document search.

Moreover, when the document search is repetitively performed based on user's utterances, the word selection result obtainable from each user's utterance can be reflected to its internal condition and maintained there. Furthermore, this word selection result can be reflected in the production of the retrieval conditions from the word selection result obtainable from the succeeding utterance. As a result, the contextual constraint formed by a series of user's utterances can be reflected to the retrieving operation. Thus, it becomes possible to increase the retrieving accuracy.

BRIEF DESCRIPTION OF THE DRAWINGS

The above and other objects, features and advantages of the present invention will become more apparent from the following detailed description which is to be read in conjunction with the accompanying drawings, in which:

FIG. 6 is an example of conversation between a client and an operator in the document retrieving apparatus of the present invention;

FIG. 7 is a flowchart showing an overall document retrieving operation in accordance with the first embodiment of the present invention;

FIG. 9 is a schematic view showing the result of each processing in the document retrieving apparatus of the present invention;

FIG. 10 is a schematic view showing the condition of the additional information administrating section in the document retrieving apparatus of the present invention;

FIG. 11 is a flowchart showing the retrieval condition producing operation performed in the document retrieving apparatus of the present invention;

FIG. 14 is a view showing the document search result and the relevant word selection result in accordance with the first embodiment of the present invention;

FIG. 15 is a flowchart showing the additional information renewing operation performed in the document retrieving apparatus of the present invention;

FIG. 16 is a schematic view showing the condition of the additional information administrating section in accordance with the first embodiment of the present invention;

FIG. 17 is a schematic view showing the word selection result based on an operator's utterance in accordance with the first embodiment of the present invention;

FIG. 18 is a view showing the result of additional information obtained in the additional information administrating section in accordance with the first embodiment of the present invention;

FIG. 19 is a view showing the result of retrieval conditions produced in the retrieval condition generating section in accordance with the first embodiment of the present invention;

FIG. 20 is a view showing the document search result and the relevant word selection result in accordance with the first embodiment of the present invention;

FIG. 21 is a view showing the renewed result of the additional information in accordance with the first embodiment of the present invention;

FIG. 22 is a schematic view showing the word selection result based on an operator's utterance in accordance with the first embodiment of the present invention;

FIG. 26 is a schematic view showing the word selection result based on a client's utterance in accordance with the second embodiment of the present invention;

FIG. 27 is a schematic view showing the word selection result based on an operator's utterance in accordance with the second embodiment of the present invention;

FIG. 29 is a view showing the comparison result of the operation performed by the word selection result comparing section in accordance with the second embodiment of the present invention;

FIG. 30 is a schematic view showing the condition of the additional information administrating section in accordance with the second embodiment of the present invention;

FIG. 31 is a schematic view showing the condition of the retrieval condition generating section in accordance with the second embodiment of the present invention;

FIG. 32 is a view showing the document search result and the relevant word selection result in accordance with the second embodiment of the present invention;

FIG. 33 is a schematic view showing the condition of the additional information administrating section in accordance with the second embodiment of the present invention;

FIG. 34 is a schematic view showing the word selection result based on a client's utterance in accordance with the second embodiment of the present invention;

FIG. 35 is a schematic view showing the word selection result based on an operator's utterance in accordance with the second embodiment of the present invention;

FIG. 36 is a view showing the word selection result in the word selection result comparing section in accordance with the second embodiment of the present invention;

FIG. 37 is a view showing the result of additional information obtained in the additional information administrating section in accordance with the second embodiment of the present invention;

FIG. 38 is a view showing the result of retrieval conditions produced in the retrieval condition generating section in accordance with the first embodiment of the present invention;

FIG. 39 is a view showing the document search result and the relevant word selection result in accordance with the second embodiment of the present invention;

FIG. 40 is a view showing the renewed result of the additional information in the additional information administrating section in accordance with the second embodiment of the present invention;

FIG. 41 is a schematic view showing the word selection result based on a client's utterance in accordance with the second embodiment of the present invention;

FIG. 42 is a schematic view showing the word selection result based on an operator's utterance in accordance with the first embodiment of the present invention;

FIG. 44 is a flowchart showing a document retrieving operation performed by the conventional document retrieving apparatus; and FIG. 45 is a view showing a conventional voice or speech recognition.

DESCRIPTION OF THE PREFERRED EMBODIMENTS

Figure 1:
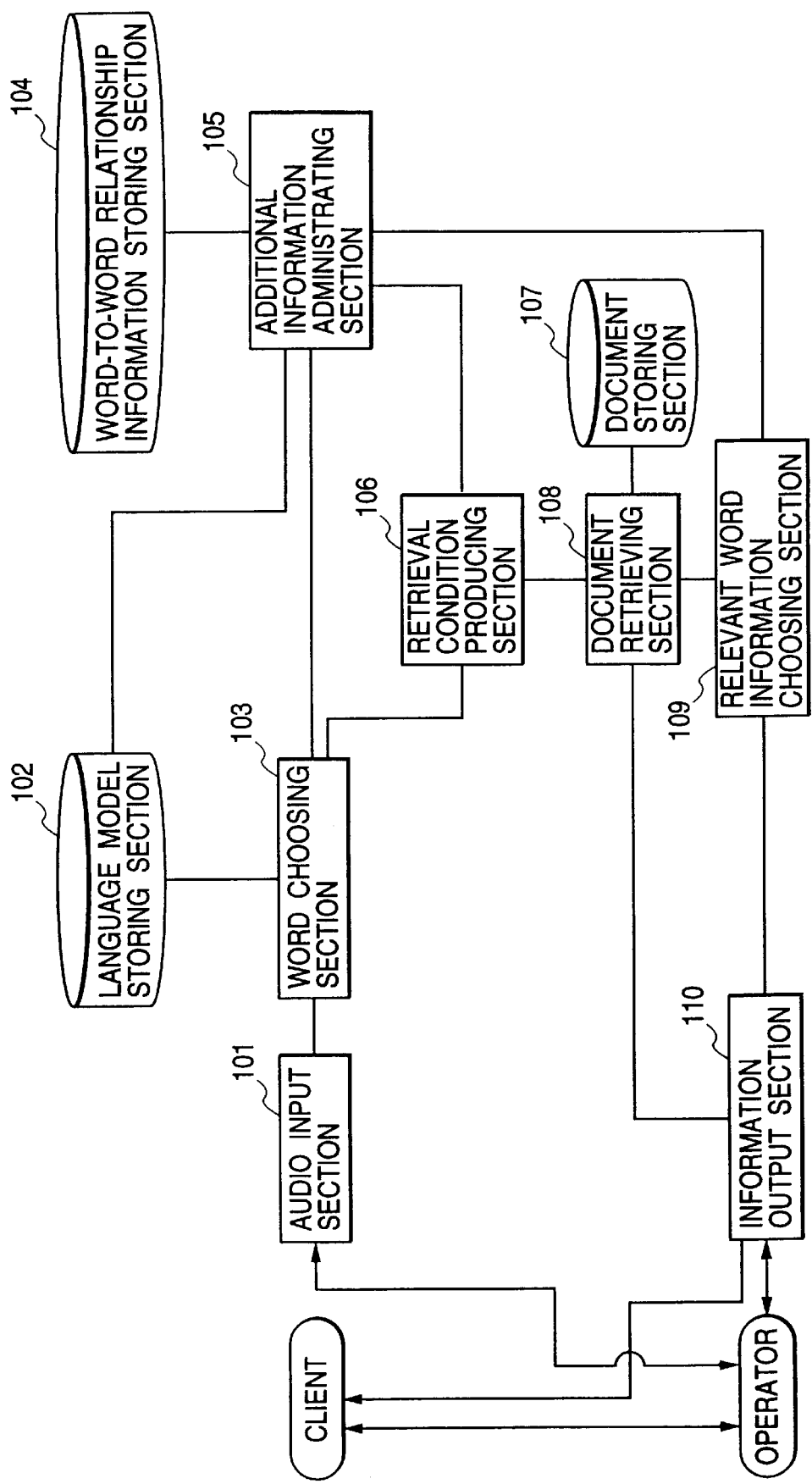
FIG. 1 is a diagram showing the arrangement of a document retrieving apparatus in accordance with a first embodiment of the present invention.

Hereinafter, preferred embodiments of the present invention will be explained with reference to FIGS. 1 to 42.

Identical parts are denoted by the same reference numerals throughout the views.

First Embodiment

FIG. 1 is a diagram showing the arrangement of a document retrieving apparatus in accordance with a first embodiment of the present invention. In FIG. 1, the document retrieving apparatus comprises an audio input section 101 which converts a sound or voice, such as an operator's utterance, into an electric signal pattern. A language model storing section 102 stores the information required in calculating the likelihood as to whether a specific word is involved in the electric signal pattern representing the input sound or voice which is produced from the audio input section 101. A word choosing section 103 analyzes the electric signal corresponding to the operator's voice produced from the audio input section 101, and chooses a specific word which is estimated to have a sufficient likelihood equal to or larger than a predetermined rate as to whether this word is involved in the original operator's utterance.

A word-to-word relationship information storing section 104 stores the information relating the relationship established between specific words. An additional information administrating section 105 produces additional information to be added to the word selection result obtained from the word choosing section 103 in accordance with its internal condition so as to renew the internal condition. Furthermore, the additional information administrating section 105 renews the information stored in the language model storing section 102 based on the additional information. A retrieval condition producing section 106 produces document retrieval conditions with reference to the word selection result chosen by the word choosing section 103 and the additional information produced by the additional information administrating section 105. A document storing section 107 stores the documents to be retrieved (i.e., retrieval objects).

A document retrieving section 108 retrieves the documents stored in the document storing section 107 in accordance with the document retrieval conditions produced from the retrieval condition producing section 106. A relevant word information choosing section 109 chooses relevant word information of a characteristic word relating to a document group produced as search result from the document retrieving section 108. And, an information output section 110 informs an operator of the information relating to the document group (i.e., the search result) obtained by the document retrieving section 108 as well as the information relating to the characteristic word peculiar to the retrieved document group (i.e., the search result) obtained by the relevant word information choosing section 109. Furthermore, the information output section 110 edits the retrieval result in compliance with operator's instructions, and shows the edited result as a renewed retrieval result to a client and the operator.

The additional information administrating section 105 renews its internal condition based on the relevant word information chosen by the relevant word information choosing section 109 and also based on the information relating to the relationship established between specific words which is stored in the word-to-word relationship information storing section 104.

Hereinafter, the detailed arrangement of each section constituting the document retrieving apparatus of the first embodiment will be explained with reference to FIGS. 2 to 5.

Figures 2, 3:
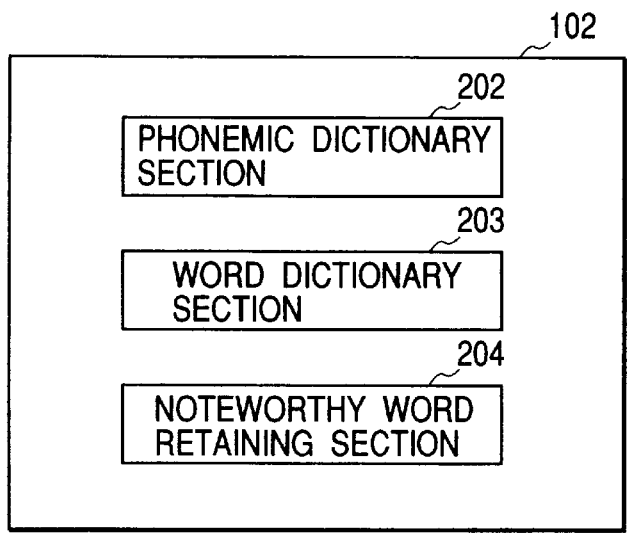
FIG. 2 is a diagram showing the arrangement of a language model storing section in the document retrieving apparatus of the present invention.
FIG. 3 is a view showing one example of data stored in a word-to-word relationship information storing section in the document retrieving apparatus of the present invention.

FIG. 2 is a diagram showing the arrangement of the language model storing section 102. In FIG. 2, the language model storing section 102 comprises a phonemic dictionary section 202 which converts the electric signal into a phonemic string, a word dictionary section 203 which stores the information relating to correlation between the selected word and the phonemic string, and a noteworthy word retaining section 204 which stores an assembly of high-priority words among the selection result. In the beginning of the processing, the noteworthy word retaining section 204 stores no data.

FIG. 3 is a view showing one example of data stored in the word-to-word relationship information storing section 104. As shown in FIG. 3, according to this embodiment, the word-to-word relationship information storing section 104 stores the information relating to the close relationship between each listed word and relevant words (i.e., frequently cooccurring words) which frequently appear together with this word.

Figure 4:
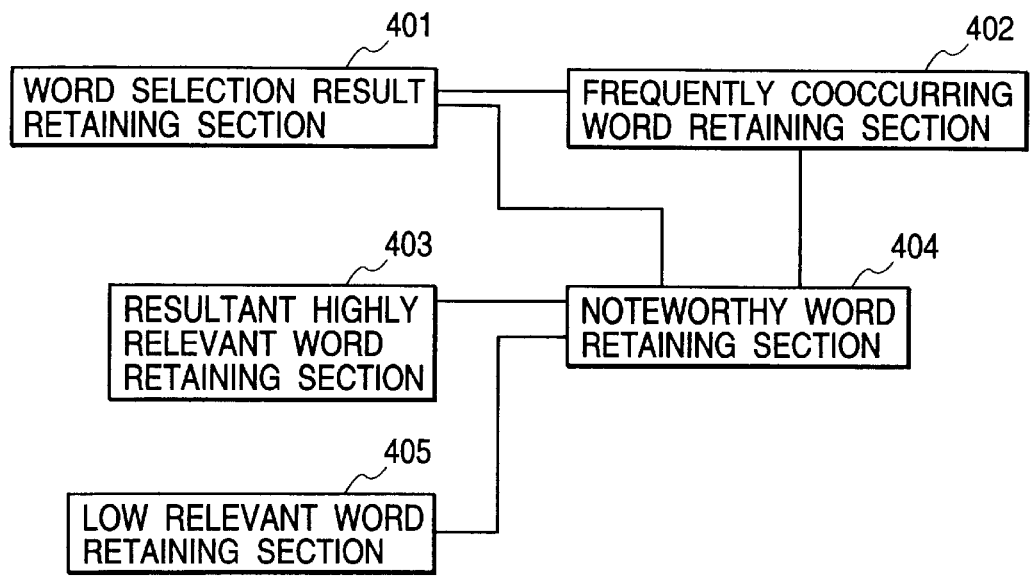
FIG. 4 is a diagram showing the arrangement of an additional information administrating section in the document retrieving apparatus of the present invention.

FIG. 4 is a diagram showing the arrangement of the additional information administrating section 105. In FIG. 4, the additional information administrating section 105 comprises a word selection result retaining section 401 which receives the word selection result produced from the word choosing section 103 and retains the received word selection result. A frequently cooccurring word retaining section 402 obtains the information relating to the frequently cooccurring words stored in the word-to-word relationship information storing section 104 and retains the obtained frequently cooccurring words. A resultant highly relevant word retaining section 403 stores the information relating to the words highly relevant to the document group (i.e., search result) chosen by the later-described relevant word information choosing section 109. A low relevant word retaining section 405 stores the information relating to the words less relevant to the document group (i.e., retrieval result) chosen by the relevant word information choosing section 109. A noteworthy word retaining section 404 retains an assembly of noteworthy words produced in accordance with a later-described algorithm.

Figure 5:
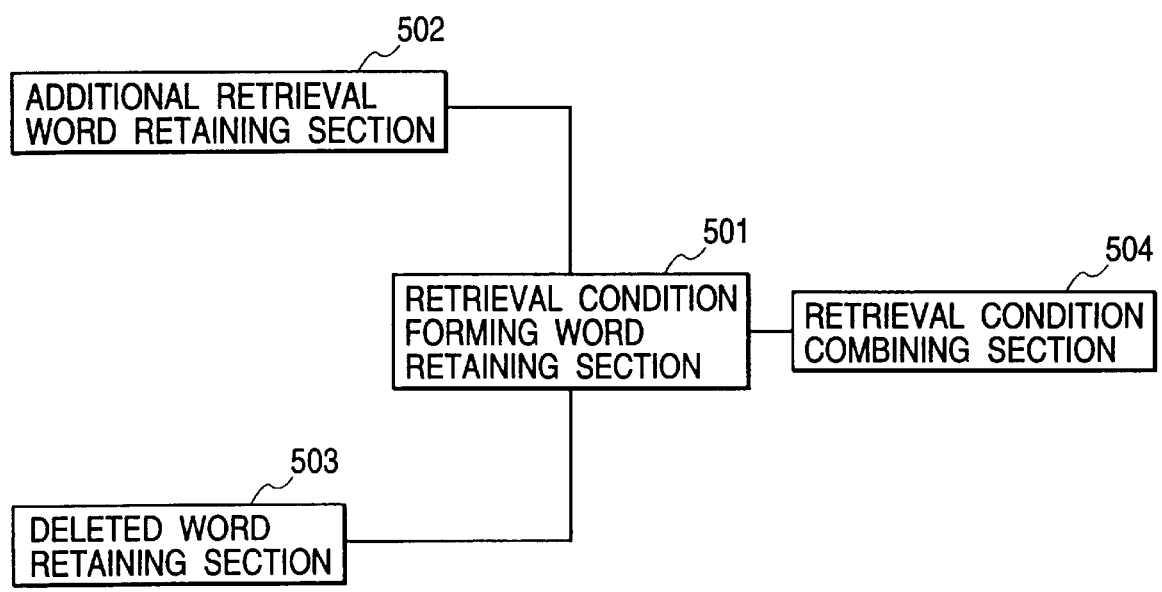
FIG. 5 is a diagram showing the arrangement of a retrieval condition generating section in the document retrieving apparatus of the present invention.

FIG. 5 is a diagram showing the arrangement of the retrieval condition generating section 106. In FIG. 5, the retrieval condition generating section 106 comprises a retrieval condition forming word retaining section 501 which retains retrieval condition forming words produced in accordance with a later-described algorithm. An additional retrieval word retaining section 502 retains additional retrieval words which include the word selection result produced by the word choosing section 103 and the resultant highly relevant words obtained from the additional information administrating section 105. A deleted word retaining section 503 retains the deleted words which include the low relevant words obtained from the additional information administrating section 105. A retrieval condition combining section 504 produces the combined retrieval conditions in accordance with the contents of the retrieval condition forming word retaining section 501.

FIG. 6 is an example of conversation between the client and the operator. Hereinafter, with reference to FIGS. 7 to 22, the document retrieving operation of the first embodiment will be explained based on the conversation between the client and the operator. It is assumed that, through the conversation, the operator provides travel information or tourism information in accordance with client's preference. The document storing section 107 stores the documents relating to various travel or tourism information. The operator is a specific speaker, while the client is a nonspecific speaker. All of the audio input section 101, the language model storing section 102, and the word choosing section 103 are optimized in advance so as to suit the characteristics of operator's utterance. Accordingly, the word choosing operation based on the operator's utterance can be performed accurately.

FIG. 7 is a flowchart showing an overall document retrieving operation performed by the document retrieving apparatus in accordance with the first embodiment of the present invention. First, the operator's utterance 602 "san'in e goryokoo desune", which is responsive to the client's utterance 601 "san'in e ryokoo shitain desuga", is processed in the following manner. In step 701 of FIG. 7, the audio input section 101 converts the operator's utterance into an electric signal, and sends the electric signal to the word choosing section 103. The word choosing section 103 selects words from the received electric signal based on the information stored in the language model storing section 102.

Figure 8:
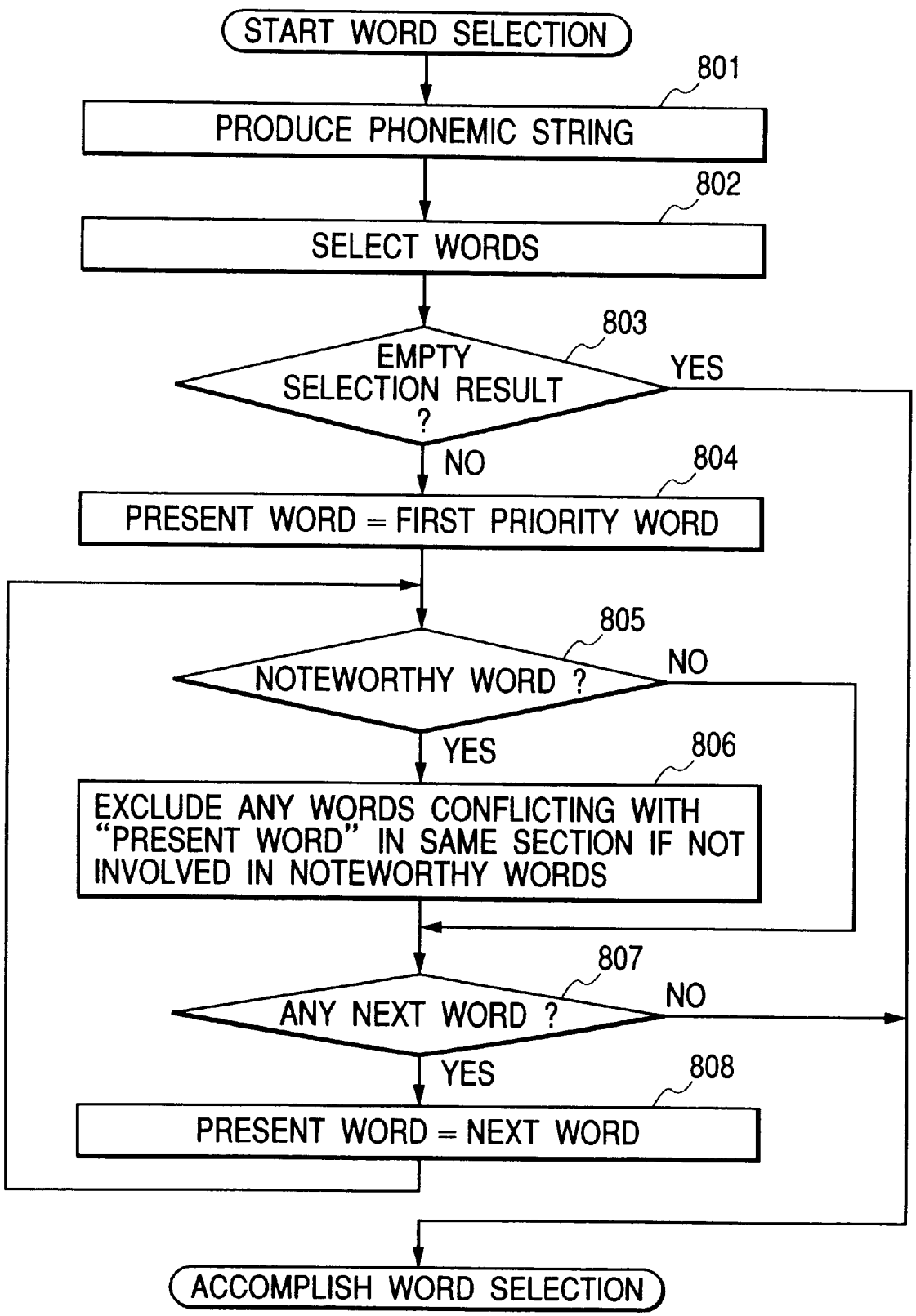
FIG. 8 is a flowchart showing the word selecting operation performed in the document retrieving apparatus of the present invention.

FIG. 8 is a flowchart showing the word selecting operation performed by the word choosing section 103. FIG. 9 is a schematic view showing the result of each processing.

First, in step 801 of FIG. 8, the word selecting operation starts from generation of phonemic string 902 (refer to FIG. 9) corresponding to the electric signal of utterance 602 (refer to FIG. 9) with reference to the information of the phonemic dictionary section 202 in the language model storing section 102.

Next, in step 802, the word selecting operation obtains an assembly of words (i.e., word selection result) 903 (refer to FIG. 9) with reference to the information of the word dictionary section 203 in the language model storing section 102 based on a simple matching method, each word having a likelihood equal to or larger than a predetermined threshold as to whether this word is involved in the phonemic string (902) produced by the step 801. According to this simple matching method, a word having a higher matching degree is given a larger likelihood. Furthermore, the information indicating the position of each selected word in the electric signal is given to the word selection result 903.

FIG. 9 shows the assembly of "san'in", "sannin", and "ryokoo" obtained as the word selection result 903 in the word selection in the step 802. Among them, "san'in" and "sannin" are candidates conflicting each other in belonging to the same section. The likelihood of "san'in" is higher than that of "sannin."

When the selection result in the step 802 is empty (YES in step 803), the word selecting operation is terminated immediately.

When the selection result in the step 802 is not empty (NO in step 803), the first word "san'in" is registered as "present word" in step 804.

Next, in step 805, it is checked whether the registered "present word" is one of the noteworthy words 904 (refer to FIG. 9) stored in the noteworthy word retaining section 204.

When the "present word" is one of the noteworthy words 94 stored in the noteworthy word retaining section 204 (i.e., YES in step 805), the word conflicting with the "present word" in belonging to the same section is excluded if this word is not involved in the noteworthy words 904 in step 806.

When the "present word" is not involved in the noteworthy words 94 stored in the noteworthy word retaining section 204 (i.e., NO in step 805), or after the processing of step 806 is completed, it is checked in step 807 whether the word selection result 903 includes the next word (i.e, second word). When the next word exists, the next word is registered as the "present word" in step 808.

The above-described steps 805 to 808 are repetitively performed to process all words of the word selection result.

In this manner, each word involved in the word selection result 903 chosen in the step 802 is checked whether it is one of the noteworthy words 904 stored in the noteworthy word retaining section 204. If this word is one of the noteworthy words 904 stored in the noteworthy word retaining section 204, the word conflicting with this word in belonging to the same section is excluded. Thus, by thoroughly performing the steps 805 to 808, adjusted word selection result 905 (refer to FIG. 9) is finally obtained.

In FIG. 9, the noteworthy word retaining section 204 is empty (i.e., retains no noteworthy words 904). Thus, the adjusted word selection result 905 includes all of the word selection result 903 obtained in the step 802. In the word selection results 903 and 905, the candidate words are aligned from left to right according to the order of corresponding utterance sections. The candidate words belonging to the same utterance section are aligned in the up and down direction according to the likelihood. In each case of the word selection results 903 and 905, the obtained candidate words are "san'in"/"sannin" and "ryokoo." Among them, "san'in" and "sannin" are candidate words conflicting with each other in belonging to the same utterance section. At this moment, the likelihood of "san'in" is higher than that of "sannin."

Returning to FIG. 7, in step 702, the additional information administrating section 105 obtains frequently cooccurring words corresponding to the word selection result 905 obtained in the step 701 with reference to the word-to-word relationship information storing section 104.

FIG. 10 is a schematic view showing the condition of the additional information administrating section 105 at the moment the processing of step 702 is finished. In step 702, the word-to-word relationship information storing section 104 stores the contents shown in FIG. 3. Thus, the words "tottori sakyu" (Tottori sand hill), "izumo taisha" (Izumo grand shrine), and "shinjiko" (Shinji lake) are frequently cooccurring words 1003 corresponding to the "san'in" (San-in area) obtained in step 701. The words "shukuhaku" (accommodations) and "tsuaa" (tour) are frequently cooccurring words 1003 corresponding to the "ryokoo" (travel) obtained in step 701. Then, the frequently cooccurring words 1003 obtained in the step 702 are added with the words (i.e., word selection result) 905 selected in step 701. The resultant word assembly, serving as "noteworthy words 904", is added to the noteworthy word retaining section 404. At this moment, the document retrieving operation is not performed yet. Thus, both of the resultant highly relevant word retaining section 403 and low relevant word retaining section 405 store no data (i.e., be in the empty condition).

Returning to FIG. 7, in step 703, the retrieval condition generating section 106 produces retrieval conditions after finishing the step 702.

Figures 12, 13:
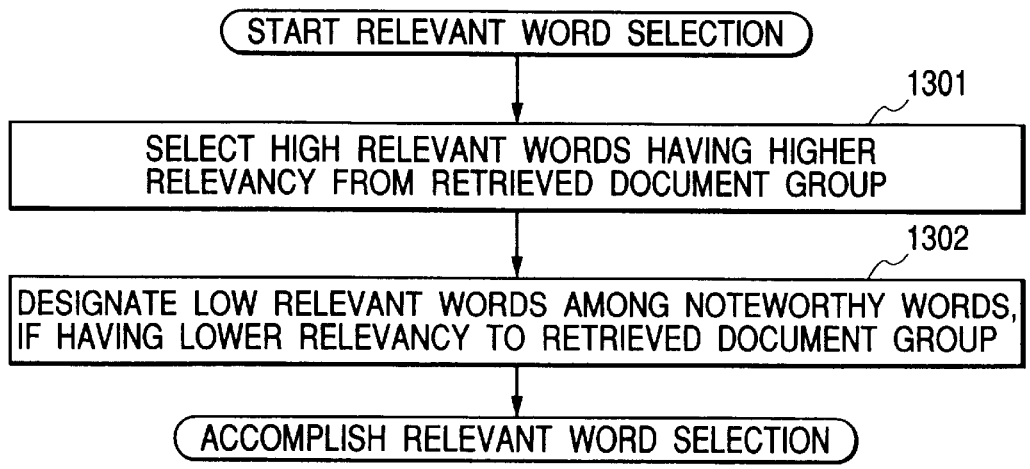
FIG. 12 is a schematic view showing the condition of the retrieval condition generating section in accordance with the first embodiment of the present invention.
FIG. 13 is a flowchart showing the relevant word selecting operation performed in the document retrieving apparatus of the present invention.

FIG. 11 is a flowchart showing the retrieval condition producing operation. FIG. 12 is a schematic view showing the condition of the retrieval condition generating section 106.

First, in step 1101, the retrieval condition generating section 106 initializes an assembly of additional retrieval words 1202 (refer to FIG. 12). Namely, the additional retrieval word retaining section 502 (refer to FIG. 5) becomes empty.

Next, in step 1102, the word selection result 905 (refer to FIG. 9) obtained in step 702 is added to the assembly of additional retrieval words 1202 and retained therein. According to the above example, "san'in" (San-in area), "sannin"(three persons) and "ryokoo" (travel) are added to the assembly of additional retrieval words 1202.

Next, in step 1103, the high relevant words 1001 (refer to FIG. 10) resultant from previous retrieving operation are added to the assembly of additional retrieval words 1202 in the additional retrieval word retaining section 502. The high relevant words 1001 are retained in the resultant highly relevant word retaining section 403 (refer to FIG. 4) of the additional information administrating section 105. According to the above example, there is no high relevant word to be added since the document retrieving operation is not performed yet.

Next, in step 1104, the low relevant words 1002 (refer to FIG. 10) retained in the low relevant word retaining section 405 of additional information administrating section 105 are designated as deleted words 1203 (refer to FIG. 12). According to the above example, there is no deleted word since the document retrieving operation is not performed yet.

Next, in step 1105, the assembly of additional retrieval words 1202 is added to the assembly of previous retrieval condition forming words 1201 (refer to FIG. 12) retained in the retrieval condition forming word retaining section 501. Thus, an assembly of new retrieval condition forming words 1204 (refer to FIG. 12) is produced. According to the above example, the retrieval condition forming word retaining section 501 is empty (i.e., retains no retrieval condition forming words). Thus, the additional retrieval words 1202 added in the step 1105 are directly designated as new retrieval condition forming words 1204.

Next, in step 1106, the deleted words 1203 retained in the deleted word retaining section 503 are excluded from the assembly of retrieval condition forming words 1204 retained in the retrieval condition forming word retaining section 501. According to the above example, there is no word to be deleted. Thus, nothing is excluded from the assembly of retrieval condition forming words 1204.

Subsequently, in step 1107, all of the retrieval condition forming words obtained in the above steps are combined by OR, i.e., by the logical sum, so as to produce the retrieval conditions 1205 (refer to FIG. 12). According to the above example, the resultant retrieval conditions 1205 is "san'in" (San-in area) OR "ryokoo" (travel) OR "sannin"(three persons).

Returning to FIG. 7, in step 704, the document retrieving section 108 retrieves the documents stored in the document storing section 107 based on the retrieval conditions 1205 obtained in the step 1107. The retrieving operation performed by the document retrieving section 108 is a whole content retrieval or the like.

Next, in step 705, the relevant word information choosing section 109 chooses the relevant words corresponding to the document search result obtained by the step 704.

FIG. 13 is a flowchart showing the relevant word selecting processing. FIG. 14 is a view showing the search result and the relevant word selection result.

First, in step 1301, high relevant words 1402 (refer to FIG. 14) are selected from the retrieval result, i.e., from the words appearing in document group 1401 (refer to FIG. 14). In this case, each of the high relevant words 1402 has the degree of relevancy higher than a predetermined threshold value with respect to the document group 1401 (i.e., retrieval result). For example, the degree of relevancy between the document group 1401 and each word can be defined or calculated by the following equation.

$$S(W) = C \times \sum_{j=0}^{n} \{TFj(W) \times IDF(W)\} \times FN(W)$$

where,

W: word;

S(W) : degree of relevancy of word W

C: predetermined constant n: total number of documents D involved in a specified document assembly;

TFj(W) : frequency of occurrence of word W in a document Dj;

FN(W): total number of documents D involving word W in the specified document assembly; and IDF(W): idf value of word W Among them, IDF(W) can be defined or calculated by the following equation.

$$IDF(W)=1-\log\{DF(W)/N\}$$

where

DF(W): number of documents in which word W appears among all documents; and

N : total number of all documents

The idf value of a predetermined word obtained from the equation of IDF(W) becomes small when the word W is a general word appearing in many documents. In other words, it becomes possible to decrease the importance (i.e., degree of relevancy) of the general words often appearing throughout the objective document. On the other hand, by considering or introducing FN(W), it becomes possible to increase the importance (i.e., degree of relevancy) of the words often appearing in the specified document assembly. In this manner, a high degree of relevancy is given to each characteristic word involved in the specific document assembly. If desirable, it is possible to normalize the above-described TF(W) by the document size (e.g., number of characters, number of word types, etc.) of the document D involving this word D or by the total number of words included in this document D.

Next, in step 1302, low relevant words 1403 are selected from the noteworthy words 904 retained in the noteworthy word retaining section 404 of the additional information administrating section 105. In this case, each of the low relevant words 1403 has the degree of relevancy lower than the predetermined threshold value with respect to the document group 1401 (i.e., retrieval result).

According to the example shown in FIG. 14, the low relevant words 1403 are selected from the group consisting of "san'in"(San-in area), "ryokoo" (travel), "sannin"(three persons), "tottori sakyu" (Tottori sand hill), "izumo taisha" (Izumo grand shrine),"shinjiko" (Shinji lake), "shukuhaku" (accommodations), and "tsuaa" (tour).

As shown in FIG. 14, as the retrieval result of document group 1401, high relevant words "onsen" (spa) and "soba" (buckwheat noodle) are picked up from the document group 1401. The word "sannin" (three persons) is designated as the low relevant word 1403.

Returning to FIG. 7, in step 706, the relevant word information choosing section 109 renews the additional information stored in the additional information administrating section 105 after finishing the step 705.

FIG. 15 is a flowchart showing the additional information renewing operation. First, in step 1501, the high relevant words (word selection result) 1402 obtained in the above-described step 705 are stored in the resultant highly relevant word retaining section 403 of the additional information administrating section 105. Furthermore, the high relevant words 1402 are added to the assembly of noteworthy words 904 retained in the noteworthy word retaining section 404 of the additional information administrating section 105. According to the above example, "onsen"(spa) and "soba" (buckwheat noodle) are newly stored as noteworthy words 904.

Next, in step 1502, the low relevant word 1403 obtained in the above-described step 705 are stored in the low relevant word retaining section 405 of the additional information administrating section 105. The low relevant words 1403 are excluded from the assembly of noteworthy words 904 retained in the noteworthy word retaining section 404 of the additional information administrating section 105. As a result, the word "sannin" (three persons) is excluded.

FIG. 16 is a schematic view showing the condition of the additional information administrating section 105 at the moment the processing of step 706 is finished.

Returning to FIG. 7, in step 707, the noteworthy words 904 retained in the noteworthy word retaining section 404 of the additional information administrating section 105 are stored in the noteworthy word retaining section 204 of the language model storing section 102 so as to renew its contents. According to the above example, the words "san'in" (San-in area), "ryokoo" (travel), "tottori sakyu" (Tottori sand hill), "izumo taisha" (Izumo grand shrine), "shinjiko" (Shinji lake), "shukuhaku" (accommodations), "tsuaa" (tour), "onsen" (spa), and "soba" (buckwheat noodle) are stored as noteworthy words 904.

Next, in step 708, the information output section 110 shows the document search result and the relevant word information to the operator. The operator determines what is presented to the client based on the obtained result (i.e., the document search result and the relevant word information). In this example, it is assumed that the operator presents nothing.

Through the above-described procedures, the operator's utterance 604 "san'in e goryokoo desune" (Do you like San-in, ser?) is produced in response to the client's utterance 60 "san'in e ryokoo shitain desuga" (I want to travel to San-in area).

Next, the operator's utterance 604 "izumo taisha desune" (Izumo ground shrine, ser?), which is responsive to the client's utterance 603 "hai izumo taisha ni itte mitai desu" (Yes, I want to visit Izumo ground shrine), is processed in the following manner. The flow of this processing is substantially the same as that of FIG. 7. Therefore, only the result of essential procedures will be explained hereinafter.

FIG. 17 is a view showing the result of word selection based on the operator's utterance 604 (step 701). At this moment, the noteworthy word retaining section 204 stores the noteworthy words 904 obtained in the previous processing.

Furthermore, the word "izomo taisha"(Izumo ground shrine), i.e., one of selection result 903 in the step 802, is included in the noteworthy words 904. Thus, among the words in the selection result 903, all the words conflicting with the "izomo taisha" in the utterance section and not included in the noteworthy words 904 are excluded through the steps 805 and 806. Namely, "Izu" (Izu peninsula) and "kaisha"(corporation) are excluded. And, only "izomo taisha" (Izumo ground shrine) remains as renewed word selection result 905.

FIG. 18 is a view showing the result of additional information (step 702) obtained in the additional information administrating section 105. As shown in FIG. 3, the word-to-word relationship information storing section 104 stores "enmusubi" (wedding) as a frequently cooccurring word of "izomo taisha" (Izumo ground shrine). Thus, the "enmusubi"(wedding) is obtained as a frequently cooccurring word 1003 and added to the assembly of noteworthy words 904.

FIG. 19 is a view showing the result of retrieval conditions (step 703) produced in the retrieval condition generating section 106. The words "onsen" (spa) and "soba" (buckwheat) are included as high relevant words 1001 with respect to the previous retrieval result 1201. Thus, "onsen" (spa) and "soba" (buckwheat) become additional retrieval words in the step 1103 in FIG. 11. As a result, the new retrieval condition forming words 1204 consisting of "san'in" (San-in area), "ryokoo" (travel), "izomo taisha" (Izumo ground shrine), "onsen" (spa), and "soba" (buckwheat) are obtained after finishing the processing of step 1106. Accordingly, the processing of step 1107 combines all of the new retrieval condition forming words by OR (i.e., by the logical sum) so as to produce new retrieval conditions; i.e., "san'in" (San-in area) OR "ryokoo" (travel) OR "izomo taisha" (Izumo ground shrine) OR "onsen" (spa) OR "soba" (buckwheat).

Next, the document search and the relevant word selection are performed in the steps 704 and 705.

FIG. 20 is a view showing the document search result and the relevant word selection result in the steps 704 and 705. In FIG. 20, "taishacho" (Taisha town), "tamatsukuri onsen" (Tamatsukuri spa) are obtained as high relevant words 1402. Furthermore, "tottori sakyuu" (Tottori sand hill) and "shinnjiko" (Shinji lake) are obtained as low relevant words 1403 in the noteworthy words. In the retrieved document group 1401, the documents relating to "izomo taisha" (Izumo ground shrine), "onsen" (spa), and "soba" (buckwheat) are ranked high.

FIG. 21 is a view showing the renewed result of the additional information (step 706) in the additional information administrating section 105. In FIG. 21, "taishacho" (Taisha town) and "tamatsukuri onsen" (Tamatsukuri spa), i.e., high relevant words 1001, are added to the assembly of noteworthy words 904 in the step 1103 of FIG. 11. On the other hand, "tottori sakyuu" (Tottori sand hill) and "shinnjiko" (Shinji lake) are excluded from the assembly of noteworthy words 904 in the step 1106 of FIG. 11.

Thus, in the step 708, the obtained search result is shown to the operator in the same manner as described above. At this moment, nothing is presented from the operator to the client.

Next, the operator's utterance 606 "soredewa izumo taisha to tamatsukuri onsen eno tabi toiu tsuaa wa ikaga desuka" (OK, how about a tour of "Travel to Izumo ground shrine & Tamatsukuri spa"?), which is responsive to the client's utterance 605 "ato onsen nimo hairitai desu" (I like spa, too), is processed in the following manner. The flow of this processing is substantially the same as that of FIG. 7. Therefore, only the result of essential procedures will be explained hereinafter.

FIG. 22 is a view showing the word selection result (step 701) based on the operator's utterance 606. At this moment, the noteworthy word retaining section 204 stores the noteworthy words 904 obtained in the previous processing. Like the above-described operation, the present operation excludes the words "aizu" (Aizu area), "izu"(Izu peninsula), "kaisha" (corporation), "tama" (Tama district), "matsuri" festival), and "onsen"(spa), and obtains the new word selection result 905 (i.e., candidate words) consisting of "izomo taisha" (Izumo ground shrine), "tamatsukuri onsen" (Tamatsukuri spa), "tabi" (travel), and "tsuaa" (tour).

As the operator can obtain or look the document group 1401 of the processing result of operator's utterances 602 and 604, the operator can make the utterance 606 "soredewa izumo taisha to tamatsukuri onsen eno tabi toiu tsuaa wa ikaga desuka" (OK how about a tour of "Travel to Izumo ground shrine & Tamatsukuri spa"?).

Hereinafter, the operation substantially similar to that of utterance 604 is performed. Thus, in the search result output processing of step 708, the operator can present the client at least part or all of the document "Travel to Izumo ground shrine and Tamatsukuri spa" through the information output section 110.

In this manner, according to the document retrieving apparatus and the document retrieving method of the present invention, the word selection is performed based on the operator's utterance. The accuracy in the word selection can be increased by utilizing the word-to-word relationship information, the highly relevant word information resultant from the retrieving operation, and the low relevant word information. The document retrieval condition can be properly renewed. Thus, appropriate and effective document search result can be shown to the operator.

The above-described embodiment performs the document retrieving operation based on only operator's utterances. However, it is needless to say that the document retrieving operation can be performed based on both of the client's utterances and the operator's utterances. Hereinafter, such a document retrieving apparatus/method for retrieving documents based on both of the client's utterances and the operator's utterances will be explained.

Second Embodiment

Figure 23:
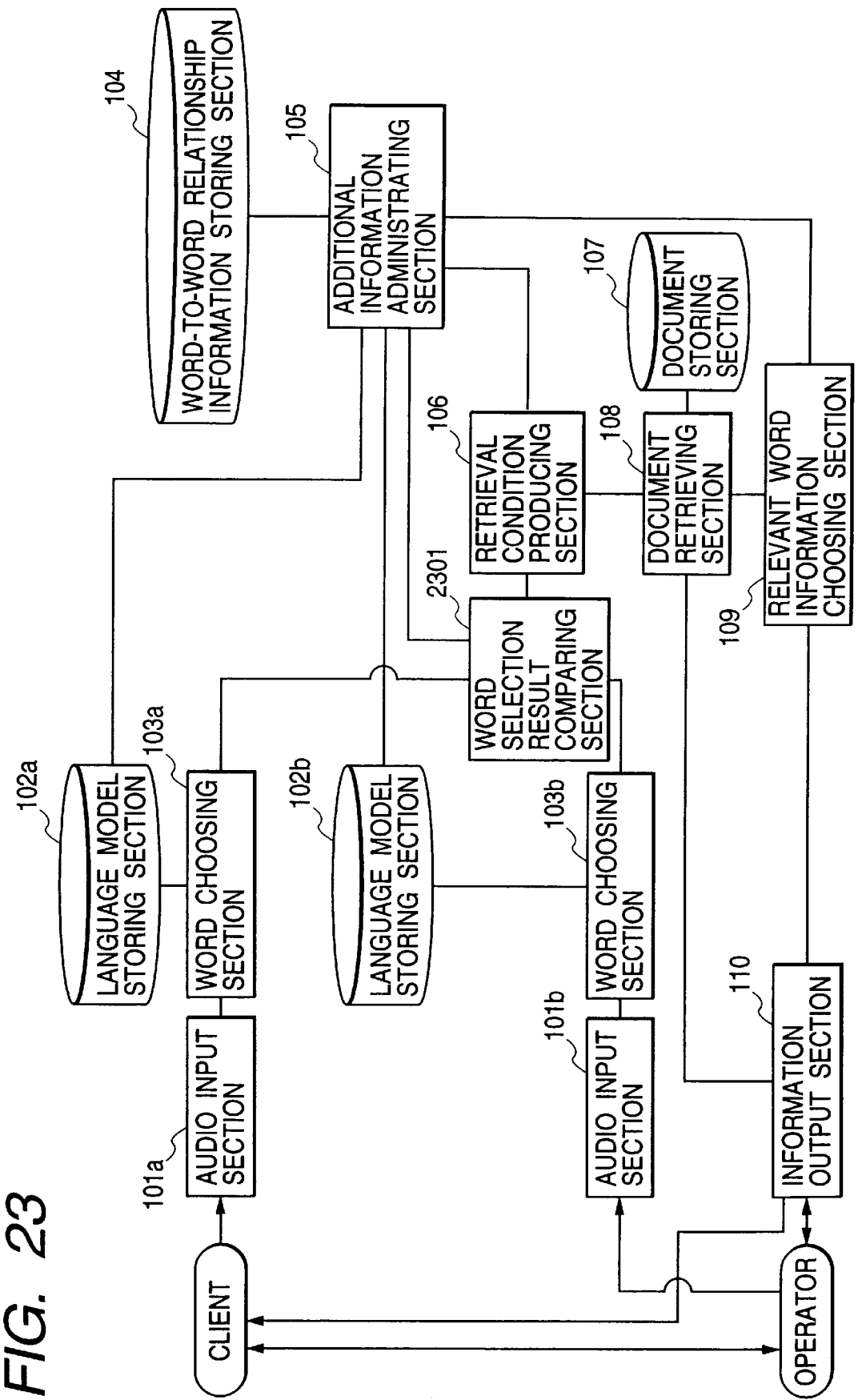
FIG. 23 is a diagram showing the arrangement of a document retrieving apparatus in accordance with a second embodiment of the present invention.

FIG. 23 is a diagram showing the arrangement of a document retrieving apparatus in accordance with a second embodiment of the present invention. The same components identical with those disclosed in FIG. 1 are denoted by the same reference numerals.

In FIG. 23, the document retrieving apparatus comprises a first audio input section 101a which converts a sound or voice of a first user, such as a client's utterance, into an electric signal pattern. A first language model storing section 102a stores the information required in calculating the likelihood as to whether a specific word is involved in the electric signal pattern representing the input sound or voice which is produced from the first audio input section 101a. A first word choosing section 103a analyzes the electric signal corresponding to the client's voice produced from the first audio input section 101a, and chooses a specific word which is estimated to have a sufficient likelihood equal to or larger than a predetermined rate as to whether this word is involved in the original client's utterance.

A second audio input section 101b converts a sound or voice of a second user, such as an operator's utterance, into an electric signal pattern. A second language model storing section 102b stores the information required in calculating the likelihood as to whether a specific word is involved in the electric signal pattern representing the input sound or voice which is produced from the second audio input section 101b. A second word choosing section 103b analyzes the electric signal corresponding to the operator's voice produced from the second audio input section 101b, and chooses a specific word which is estimated to have a sufficient likelihood equal to or larger than a predetermined rate as to whether this word is involved in the original operator's utterance.

A word selection result comparing section 2301 compares a first word selection result obtained from the first word choosing section 103a with a second word selection result obtained from the second word choosing section 103b to produce a new word selection result. A word-to-word relationship information storing section 104 stores the information relating the relationship established between specific words.

An additional information administrating section 105 produces additional information to be added to the word selection result obtained from the word selection result comparing section 2301 in accordance with its internal condition so as to renew the internal condition. Furthermore, the additional information administrating section 105 renews the information stored in the language model storing sections 102a and 102b based on the additional information.

A retrieval condition producing section 106 produces document retrieval conditions with reference to the word selection result chosen by the word selection result comparing section 2301 and the additional information produced by the additional information administrating section 105. A document storing section 107 stores the documents to be retrieved (i.e., retrieval objects). A document retrieving section 108 retrieves the documents stored in the document storing section 107 in accordance with the document retrieval conditions produced from the retrieval condition producing section 106.

A relevant word information choosing section 109 chooses relevant word information of a characteristic word relating to a document group produced as search result from the document retrieving section 108. And, an information output section 110 informs the operator of the information relating to the document group (i.e., the search result) obtained by the document retrieving section 108 as well as the information relating to the characteristic word peculiar to the retrieved document group (i.e., the search result) obtained by the relevant word information choosing section 109. Furthermore, the information output section 110 edits the retrieval result in compliance with operator's instructions, and shows the edited result as a renewed retrieval result to the client and the operator.

The additional information administrating section 105 renews its internal condition based on the relevant word information chosen by the relevant word information choosing section 109 and also based on the information relating to the relationship established between specific words which is stored in the word-to-word relationship information storing section 104. Each of the language model storing sections 102a and 102b has substantially the same arrangement as that of the language model storing section 102 (refer to FIGS. 1 and 2).

Figure 24:
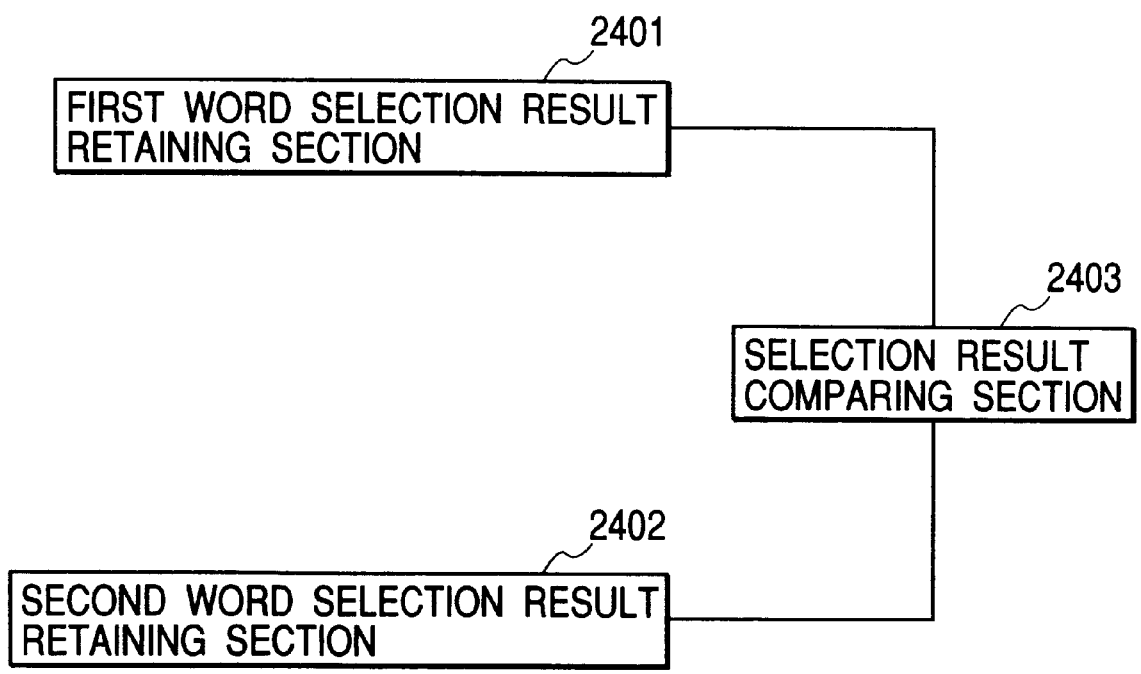
FIG. 24 is a diagram showing an arrangement of a word selection result comparing section in accordance with the second embodiment of the present invention.

FIG. 24 is a diagram showing an arrangement of the word selection result comparing section 2301. In FIG. 24, the word selection result comparing section 2301 comprises a first word selection result retaining section 2401 which retains the word selection result obtained from the first word choosing section 103a (i.e., from the client's utterance). A second word selection result retaining section 2402 retains the word selection result obtained from the second word choosing section 103b (i.e., from the operator's utterance). A selection result comparing section 2403 compares the word selection result stored in the first word selection result retaining section 2401 with the word selection result stored in the second word selection result retaining section 2402, so as to produce a selection result based on the comparison.

It is assumed that, through the conversation, the operator provides travel information or tourism information in accordance with client's preference. The document storing section 107 stores the documents relating to various travel or tourism information.

The operator is a specific speaker, while the client is a nonspecific speaker. Thus, the first audio input section 101a, the first language model storing section 102a, and the first word choosing section 103a are optimized in advance in accordance with the characteristics of an average speaker so that the word choosing operation can be applied to many of unspecified speakers. On the other hand, all of the second audio input section 101b, the second language model storing section 102b, and the second word choosing section 103b are optimized in advance so as to suit the characteristics of a specific operator. Accordingly, the accuracy of the word choosing operation performed based on the client's utterance is relatively low. The accuracy of the word choosing operation performed based on the operator's utterance is high. Hereinafter, the document search operation will be explained based on the conversation between the client and the operator shown in FIG. 6.

Figure 25:
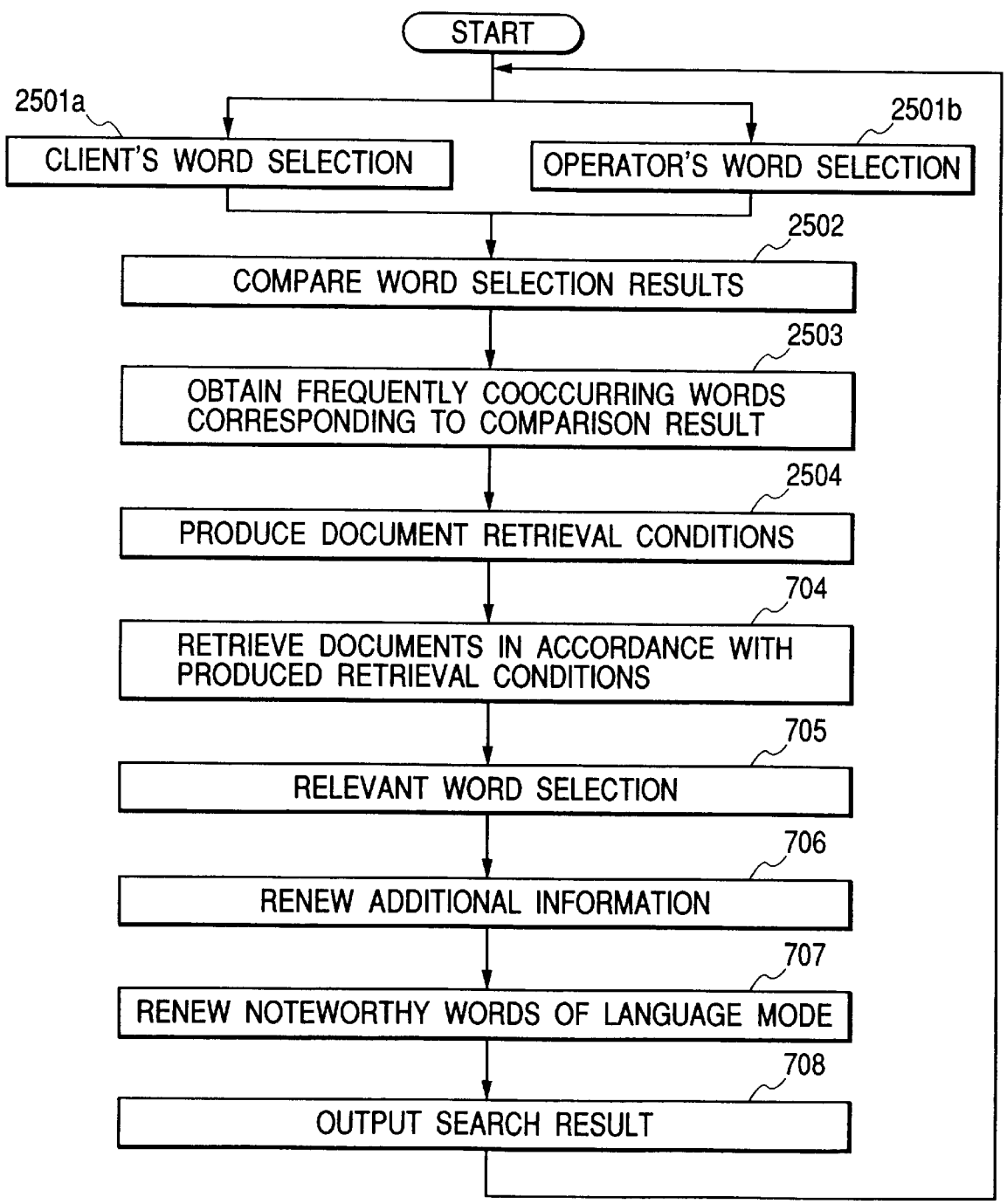
FIG. 25 is a flowchart showing an overall document retrieving operation in accordance with the second embodiment of the present invention.

FIG. 25 is a flowchart showing an overall document retrieving operation performed by the document retrieving apparatus shown in FIG. 23. In FIG. 25, the same steps as those disclosed in FIG. 7 are denoted by the same step numbers. Hereinafter, the document retrieving operation performed based on the conversation between the client and the operator will be explained with reference to attached drawings.

First, the client's utterance 601 "san'in e ryokoo shitain desuga" is processed in the following manner.

In step 2501a of FIG. 25, the first audio input section 101a converts the client's utterance into an electric signal, and sends the electric signal to the first word choosing section 103a. The first word choosing section 103a selects words from the received electric signal based on the information stored in the first language model storing section 102a. The detailed word selection processing performed by the first word choosing section 103a is substantially the same as the above-described flowchart of FIG. 8.

FIG. 26 is a schematic view showing the word selection result based on the client's utterance 601. In FIG. 26, respective items are similar to those shown in FIG. 9. According to this example, the word selection result 905a consists of "sannin"(three persons), "ryokoo"(travel), "iin" (doctor's office), and "san'in" (San-in area). Among them, "sannin"(threepersons) and "san'in" (San-in area) conflict with each other in belonging to the same utterance section. At this moment, the likelihood of "sannin" (threepersons) is higher than that of "san'in" (San-in area).

Next, in step 2501b of FIG. 25, the operator's utterance 602 "san'in e doryokoo desune" is processed. This processing is substantially the same as the word selecting operation shown in FIG. 8.

FIG. 27 is a schematic view showing the word selection result based on the operator's utterance 602. In FIG. 27, respective items are similar to those shown in FIG. 9.

According to this example, the word selection result 905b consists of "san'in"(San-in area), "ryokoo"(travel), and "sannin"(threepersons). Among them, "san'in" (San-in area) and "sannin"(three persons) conflict with each other in belonging to the same utterance section. At this moment, the likelihood of "san'in" (San-in area) is higher than that of "sannin"(three persons).

Next, in step 2502, the word selection result comparing section 2301 compares the client's word selection result 905a chosen by the first word choosing section 103a with the operator's word selection result 905b chosen by the second word choosing section 103b.

Figure 28:
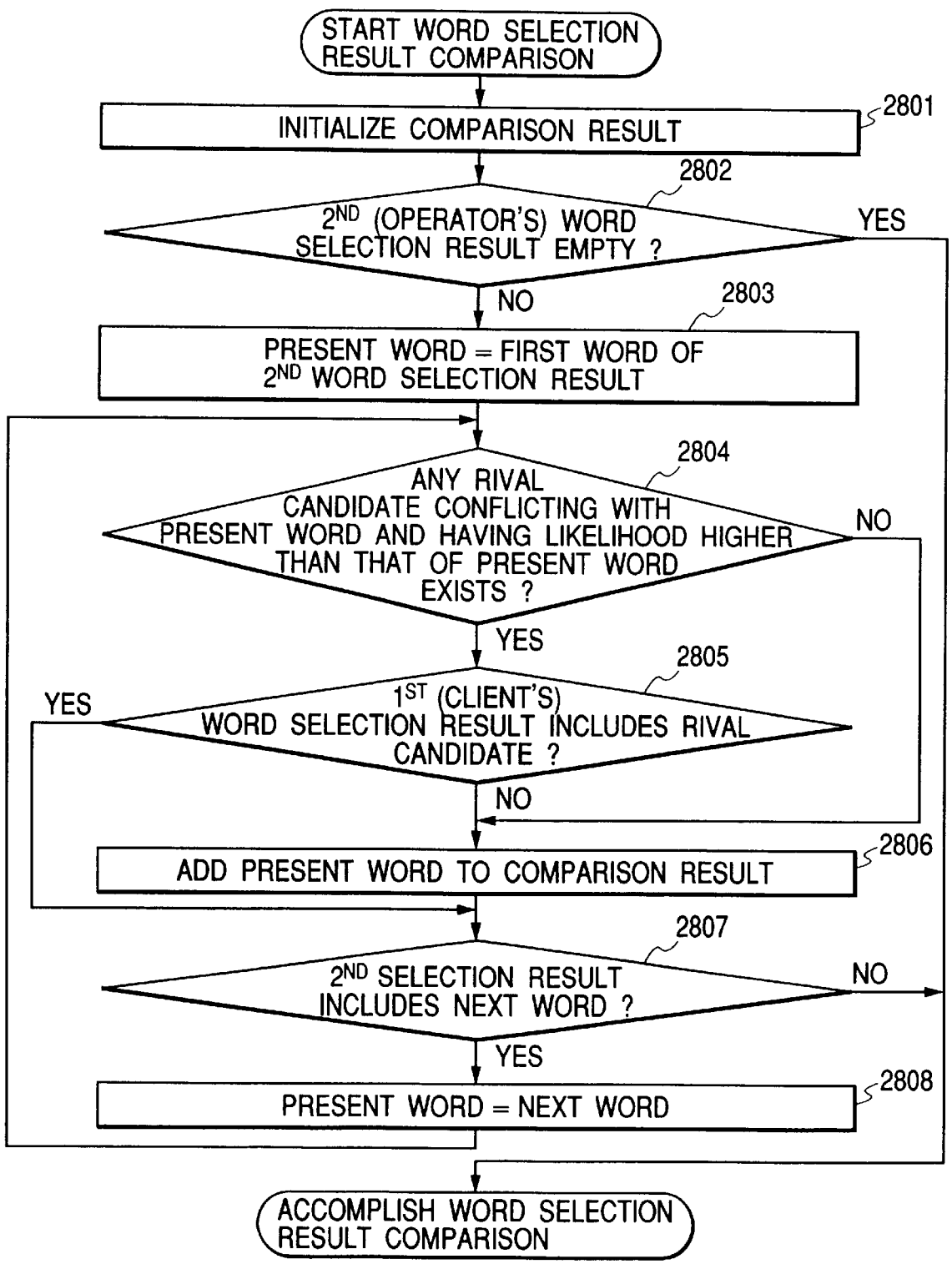
FIG. 28 is a flowchart showing the operation performed in the word selection result comparing section in accordance with the second embodiment of the present invention.
Figure 43:
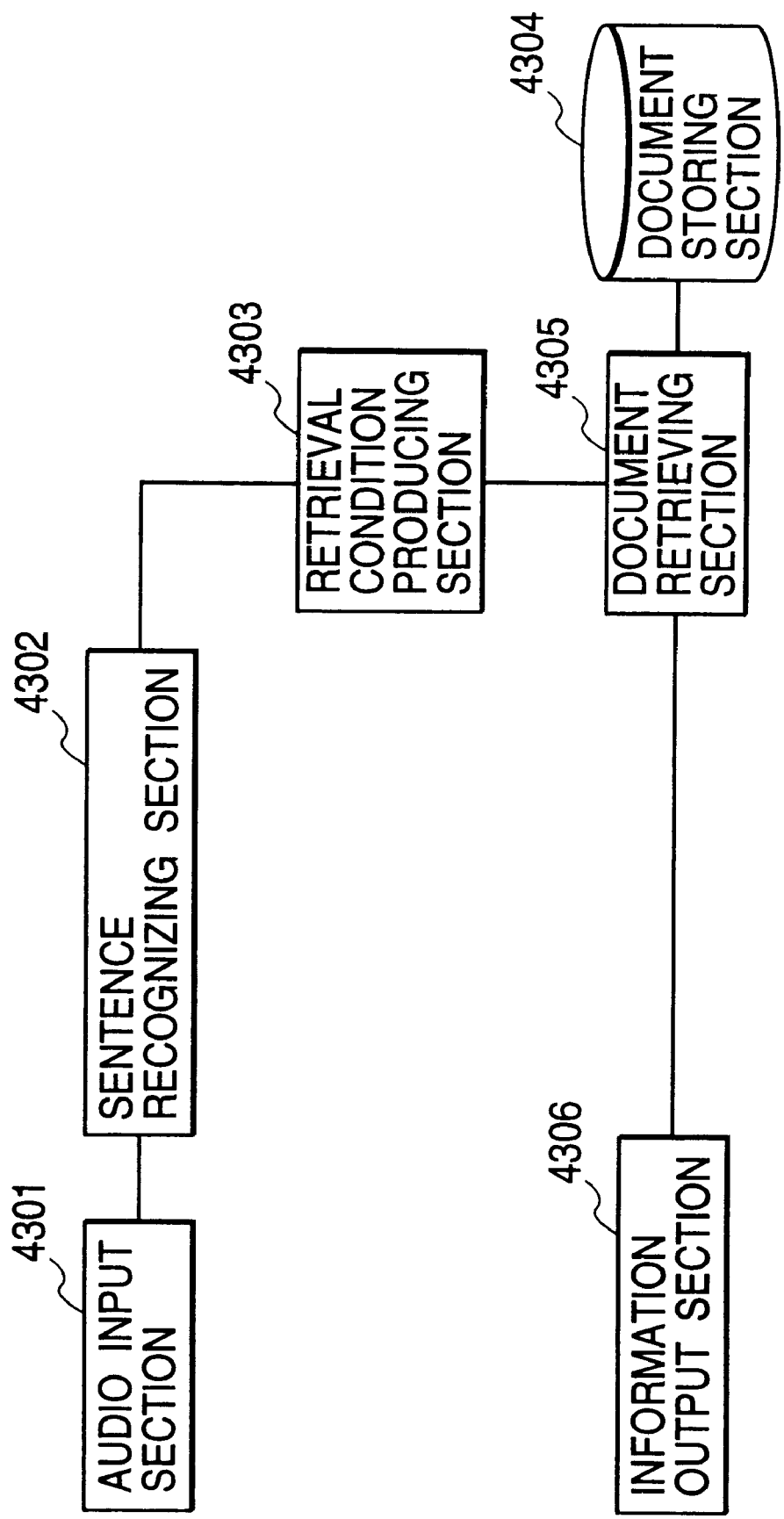
FIG. 43 is a diagram showing the arrangement of a conventional document retrieving apparatus.

FIG. 28 is a flowchart showing the operation performed in the word selection result comparing section 2301. FIG. 29 is a view showing the comparison result of the operation performed by the word selection result comparing section 2301. In the beginning of this word selection result comparing operation, the first word selection result retaining section 2401 stores the first word selection result 905a obtained from the client's utterance 601 in the above-described manner. Furthermore, the second word selection result retaining section 2402 stores the second word selection result 905b obtained from the operator's utterance 602 in the above-described manner.

First in step 2801 of FIG. 28, the comparison result 2901 (refer to FIG. 29) is initialized (i.e., becomes empty).

Next, in step 2802, it is checked as to wether the second word selection result 905b obtained by the second word choosing section 103b (i.e., obtained from the operator's utterance 602) is empty. When the second word selection result 905b is empty (i.e., YES in step 2802), this comparing operation is terminated immediately.

When the second word selection result 905b is not empty (i.e., NO in step 2802), the first word in the second word selection result 905b is registered as the present word in step 2803. In the example shown in FIG. 29, according to the second word selection result 905b, the first word "san'in" is registered as the present word.

Next, in step 2804, it is checked as to whether there is any word (i.e., opponent or rival candidate) conflicting with the present word in belonging to the same utterance section and having the likelihood higher than that of the present word. According to the example shown in FIG. 29, it is checked if there is any word conflicting with "san'in" and having the higher likelihood than that of "san'in." In this case, "sannin" is a conflicting candidate. However, the likelihood of "sannin" is lower than that of "san'in." Thus, no opponent or rival candidate is found.

When any opponent or rival candidate is found (i.e., YES in step 2804), it is then checked in step 2805 whether this opponent or rival candidate is involved in the first word selection result 905a obtained by the first word choosing section 103a (i.e., obtained from the client's utterance 601).

On the other hand, when no opponent or rival candidate is found (i.e., NO in step 2804), or when the opponent or rival candidate is not involved in the first word selection result 905a (NO in step 2805), the present word is registered to the comparison result 2901 (refer to FIG. 29) in step 2806. According to the above-described example, the present word "san'in" is registered to the comparison result 2901.

When the opponent or rival candidate is involved in the first word selection result 905a (YES in step 2805), or after finishing the processing of step 2806, it is then checked in step 2807 as to whether any next word is present in the second word selection result 905b. In this case, selection of the words is performed in order of the choosing section. When there is no word to be processed next, this comparing operation is terminated immediately.

When the next word is present, the word is registered as the present word in step 2808. According to the above example, "sannin" is selected as the next word and registered as the present word.

The above-described steps 2804 to 2808 are repetitively performed to process all words involved in the second word selection result 905b. According to the above example, when the present word is "sannin", the rival candidate "san'in" is detected in the step 2804. As this rival candidate "san'in" is involved in the first word selection result 905*a* (i.e., YES in step 2805), the "sannin" is not registered to the comparison result 2901. The comparison operation proceeds to the next word "ryokoo."

In case of the present word "ryokoo", it is registered to the comparison result 2901 through the processing of steps 2804 and 2806.

As described above, the "san'in" and "ryokoo" involved in the operator's selection result 905*b* are directly added to the comparison result 2901.

On the other hand, regarding the word "sannin", there is a candidate "san'in" having a higher likelihood that they conflict with each other in belonging to the same utterance section. Furthermore, the word "san'in" is involved in the client's word selection result 905*a*. Accordingly, the word "sannin" is excluded. The word "iin" involved only in the client's word selection result 905*a* is not added to the comparison result 2901.

Returning to FIG. 25, in step 2503, the additional information administrating section 105 refers to the word-to-word relationship information storing section 104 to obtain frequently cooccurring words corresponding to the comparison result 2901 obtained in the above-described step 2502 (as explained with reference to FIG. 28). Th processing of step 2503 is substantially the same as the processing of step 702 shown in FIG. 7, although different in the objective for which the frequently cooccurring words are obtained. Namely, the objective of the frequently cooccurring words is the comparison result 2901 in the step 2503 but is the word selection result 905 chosen by the word choosing section 103 in the step 702.

According to the above example, the frequently cooccurring words obtained for the selected word "san'in" (San-in area) are "tottori sakyu"(Tottori sand hill), "izumo taisha" (Izumo ground shrine), and "shinjiko" (Shinji lake). The frequently cooccurring words obtained for the selected word "ryokoo" (travel) are "shukuhaku" (accommodations) and "tsuaa" (tour). The frequently cooccurring words thus obtained are stored in the frequently cooccurring word retaining section 402 (refer to FIG. 4). Then, the assembly of the selected words and their corresponding frequently cooccurring words is added as "noteworthy words" to the noteworthy word retaining section 404 (refer to FIG. 4).

As the document retrieving operation is not performed yet, the resultant highly relevant word retaining section 403 (refer to FIG. 4) and the low relevant word retaining section 405 (refer to FIG. 4) are empty.

FIG. 30 is a schematic view showing the condition of the additional information administrating section 105 at the moment the processing of step 2503 is finished.

Subsequently, in step 2504, the retrieval condition producing section 106 produces the retrieval conditions. The processing of step 2504 is substantially the same as that of step 703 shown in FIG. 7, although different in the objective for which the additional retrieval wards are obtained. Namely, the objective of the additional retrieval wards is the comparison result 2901 in the step 2504 but is the word selection result 905 chosen by the word choosing section 103 in the step 703.

FIG. 31 is a schematic view showing the condition of the retrieval condition generating section 106 at the moment the processing of step 2504 is finished.

The succeeding steps of FIG. 25 are performed in the same manner as the steps 704 to 708 shown in FIG. 7.

FIG. 32 is a view showing the document search result and the relevant word selection result at the moment the processing of steps 704 and 705 (refer to FIG. 25) for the utterances 601 and 602 are finished. FIG. 32 is different from FIG. 14 in that the word "sannin"(three persons) is not involved in the low relevant words in the noteworthy words.

Namely, providing the word selection result comparing section 2301 makes it possible to simplify the processing of the document retrieving section 108. Thus, the load in the document search can be reduced.

FIG. 33 is a schematic view showing the condition of the additional information administrating section at the moment the processing of step 705 shown in FIG. 25 is finished.

The client's utterance 603 and the operator's utterance 604 are similarly processed by repeating the above-described all steps 2501*a* to 708 shown in FIG. 25.

FIG. 34 is a schematic view showing the word selection result based on the client's utterance 603 in the step 2501*a*. FIG. 35 is a schematic view showing the word selection result based on the operator's utterance 604 in the step 2501*b*. FIG. 36 is a view showing the word selection result obtained in the word selection result comparing section 2301 at the moment the processing of step 2502 is completed. FIG. 37 is a view showing the result of additional information obtained in the additional information administrating section 105 at the moment the processing of step 2503 is completed. FIG. 38 is a view showing the result of retrieval conditions produced in the retrieval condition generating section 106 at the moment the processing of step 2503 is completed. FIG. 39 is a view showing the document search result and the relevant word selection result at the moment the processing of steps 704 and 705 (refer to FIG. 25) for the utterances 603 and 604 are completed. FIG. 40 is a view showing the renewed result of the additional information in the additional information administrating section 105 at the moment the processing of step 706 is completed.

The client's utterance 605 and the operator's utterance 606 are similarly processed by repeating the above-described all steps 2501*a* to 708 shown in FIG. 25.

FIG. 41 is a schematic view showing the word selection result based on the client's utterance 605 in the step 2501*a*. FIG. 42 is a schematic view showing the word selection result based on the operator's utterance 606 in the step 2501*b*.

After thoroughly performing the above-described operations, in the result output processing of step 708, the operator can present the client at least part or all of the document "Travel to Izumo ground shrine and Tamatsukuri spa."

In this manner, according to the embodiment of the present invention, the word selection is performed based on both of the client's utterance the operator's utterance. The accuracy in the word selection can be increased by utilizing the word-to-word relationship information, the highly relevant word information resultant from the retrieving operation, and the low relevant word information. The document retrieval condition can be properly renewed. Thus, appropriate and effective document search result can be shown to the operator.

It is possible to further modify the above-described document retrieving apparatus/method of the present invention. For example, in the document retrieving apparatus shown in FIG. 23, the word selection result comparing section 2301 can be replaced by an appropriate switching device which selectively connects either the first word choosing section 103*a* or the second word choosing section 103*b* to the additional information administrating section 105 and to the retrieval condition generating section 106 as shown in FIG. 1.

Accordingly, differently from the conventional sentence recognition, the document retrieving apparatus and the document retrieving method of the present invention choose the estimated word to be involved in the original user's utterance when this word has a predetermined likelihood. Hence, as long as the true or genuine word inherently involved in the original voice or speech has a predetermined likelihood, it becomes possible to prevent the estimated word from being deleted or dropped in the sentence recognition even in a case where only one sentence is finally constructed based on the recognized candidate words. Accordingly, the present invention makes it possible to realize an effective and reliable document search without being adversely influenced by the sentence recognition accuracy in the voice-based document retrieval operation.

Furthermore, differently from the conventional sentence recognition, it is not necessary to choose all of the words involved in the user's utterance, because the present invention only requires to constitute a minimum language model in accordance with the document assembly serving as retrieval objects. Thus, the present invention reduces the cost in collecting or establishing the necessary language data base.

Moreover, when the document search is repetitively performed based on user's utterances, the word selection result obtainable from each user's utterance can be reflected to its internal condition and maintained there. Furthermore, this word selection result can be reflected in the production of the retrieval conditions from the word selection result obtainable from the succeeding utterance. As a result, the contextual constraint formed by a series of user's utterances can be reflected to the retrieving operation. Thus, it becomes possible to increase the retrieving accuracy.

Furthermore, when the document search is repetitively performed based on user's utterances, the word selection result obtainable from each user's utterance can be reflected to its internal condition. Furthermore, it is possible to reflect the word selection result to the language model which is referred to in the word choosing operation. As a result, the contextual constraint formed by a series of user's utterances can be reflected to the word choosing operation. Thus, it becomes possible to increase the word choosing accuracy.

Furthermore, it becomes possible to refer to the information relating to the relationship established between the specific words in addition to the internal condition as well as to refer to the word selection result, in the production of the retrieval conditions. Thus, the retrieval conditions can be produced by using the additional information resulting from the word selection result. For example, when a word seldom appears together with another selected word, it is preferable to delete or exclude this strange word from the retrieval conditions. Accordingly, even when any error occurs in the word choosing operation, it becomes possible to surely exclude such erroneous words from the retrieval conditions. Thus, it becomes possible to realize an effective and reliable voice-based document search.

Furthermore, it is possible to refer to the word-to-word relationship to check whether or not a word not involved in the word selection result has any relationship with the word involved in the word selection result. If there is a relationship that the two words tend to appear together, it will be preferable to produce the retrieval conditions so as to include such a word not involved in the word selection result. Or, it will be preferable to produce the retrieval conditions so as to increase the priority order of a resultant document including such a word. This will result in an effective and reliable voice-based document search.

On the contrary, as a result of the reference to the word-to-word relationship, it may be concluded that the above two words seldom appear together. In this case, it-will be preferable to produce the retrieval conditions so as to exclude the word not involved in the word selection result. Or, it will be preferable to produce the retrieval conditions so as to decrease the priority order of a resultant document including such a word. This will also result in an effective and reliable voice-based document search.

To realize an effective and reliable document search, it becomes possible to utilize the cooccurring nature of two specific words in producing the retrieval conditions based on the word selection result obtained from user's utterance.

The characteristic word is chosen from the document group produced as search result obtainable from the user's utterance. It is possible to produce additional information indicating the cooccurring nature between the chosen characteristic word and the word chosen from the user's utterance. The produced additional information is reflected in the renewal of the internal condition. Thus, the chosen characteristic word can be utilized in the production of the retrieval conditions for the retrieval operation based on the succeeding user's utterance. This arrangement is advantageous in that no preparation is required for the knowledge relating to the relationship established between specific words. Thus, without preparing such knowledge, the document search operation is effectively performed.

Furthermore, choosing the cooccurring nature from the retrieved document can be utilized in the following manner. For example, this arrangement is applicable to the information relating to the cooccurring nature only found in a specific field or theme, or to the information relating to the cooccurring nature relevant to the brand-new peculiar noun. Thus, it becomes possible to realize an effective and reliable document search.

Furthermore, the word selection results obtained from the first and second users are compared. The comparison result is used to produce the retrieval conditions. Thus, it becomes possible to realize an effective and reliable document search when two users cooperatively perform the document search.

Moreover, it becomes possible to differently edit the retrieval result according to each of two users and to output the edited retrieval result to respective users.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A document retrieving apparatus for performing a document search based on sound including voice, said document retrieving apparatus comprising:
   audio input means for converting a sound into an electric signal and generating a character pattern data;
   language model storing means for storing likelihood information which determines the likelihood of a word recognized from said character pattern data produced from said audio input means;

word choosing means for choosing an estimated word to be involved in said character pattern data produced from said audio input means, as a word selection result based on the likelihood information stored in said language model storing means;

additional information administrating means for producing additional information to be added to said word selection result chosen by said word choosing means, said additional information administrating means renewing its internal condition so as to reflect the result of repetitive retrieval operations;

retrieval condition producing means for producing document retrieval conditions based on both of said word selection result chosen by said word choosing means and said additional information produced by said additional information administrating means;

document storing means for storing documents to be retrieved; and document retrieving means for retrieving said documents stored in said document storing means based on said document retrieval conditions produced from said retrieval condition producing means.

2. The document retrieving apparatus in accordance with claim 1, wherein said additional information administrating means renews said likelihood information stored in said language model storing means based on said additional information.

3. The document retrieving apparatus in accordance with claim 1, further comprising:

word-to-word relationship information storing means for storing word-to-word relationship information relating to the relationship established between predetermined words, wherein said additional information administrating means produces the additional information to be added to said word selection result chosen by said word choosing means based on both said word-to-word relationship information stored in said word-to-word relationship information storing means and said internal condition of said additional information administrating means, so as to renew said internal condition.

4. The document retrieving apparatus in accordance with claim 1, further comprising information output means for outputting search result obtained from said document retrieving means.

5. The document retrieving apparatus in accordance with claim 1, further comprising:

relevant word information choosing means for choosing relevant word information of a characteristic word relating to a document group produced as search result from said document retrieving means, wherein said additional information administrating means renews said internal condition of said additional information administrating means based on said relevant word information chosen by said relevant word information choosing means.

6. The document retrieving apparatus in accordance with claim 5, wherein said additional information administrating means renews said internal condition of said additional information administrating means based on both said relevant word information chosen by said relevant word information choosing means and said word-to-word relationship information stored in said word-to-word relationship information storing means.

7. A document retrieving apparatus for performing a document search based on sound including voice, said document retrieving apparatus comprising:

first audio input means for converting a first sound of a first user into an electric signal and generating a first character pattern data;

first language model storing means for storing likelihood information which determines the likelihood of a word recognized from said first character pattern data produced from said first audio input means;

first word choosing means for choosing an estimated word to be involved in said first character pattern data produced from said first audio input means, as a first word selection result obtained from said first user based on the likelihood information stored in said first language model storing means;

second audio input means for converting a second sound of a second user into an electric signal and generating a second character pattern data;

second language model storing means for storing likelihood information which determines the likelihood of a word recognized from said second character pattern data produced from said second audio input means;

second word choosing means for choosing an estimated word to be involved in said second character pattern data produced from said second audio input means, as a second word selection result obtained from said second user based on the likelihood information stored in said second language model storing means;

word selection result comparing means for comparing said first word selection result chosen by said first word choosing means with said second word selection result chosen by said second word choosing means to produce a new word selection result; retrieval condition producing means for producing document retrieval conditions based on said new word selection result produced by said word selection result comparing means;

document storing means for storing documents to be retrieved; and document retrieving means for retrieving said documents stored in said document storing means based on said document retrieval conditions produced from said retrieval condition producing means, thereby realizing a retrieval operation based on cooperation between said first user and said second user.

8. The document retrieving appartus in accordance with claim 7, further comprising imformation output means for outputting search result obtained from said document retrieving means in such a manner that said search result is differently edited for each of a source of said first sound and a source of said second sound.

9. The document retrieving apparatus in accordance with claim 7, further comprising additional information administrating means for producing additional information to be added to said new word selection result produced by said word selection result comparing means in accordance with its internal condition, so as to renew said internal condition, wherein said retrieval condition producing means produces said document retrieval conditions based on both said new word selection result produced by said word selection result comparing means and the additional information produced by said additional information administrating means.

10. The document retrieving apparatus in accordance with claim 9, wherein said additional information administrating means renews said likelihood information stored in said language model storing means based on said additional information.

11. The document retrieving apparatus in accordance with claim 9, further comprising word-to-word relationship information storing means for storing word-to-word relationship information relating to the relationship established between predetermined words, wherein said additional information administrating means produces the additional information to be added to said new word selection result produced by said word selection result comparing means based on both said word-to-word relationship information stored in said word-to-word relationship information storing means and said internal condition of said additional information administrating means, so as to renew said internal condition.

12. The document retrieving apparatus in accordance with claim 9, further comprising:

relevant word information choosing means for choosing relevant word information of a characteristic word relating to a document group produced as search result from said document retrieving means, wherein said additional information administrating means renews said internal condition of said additional information administrating means based on said relevant word information chosen by said relevant word information choosing means.

13. The document retrieving apparatus in accordance with claim 12, wherein:

said additional information administrating means renews said internal condition of said additional information administrating means based on both said relevant word information chosen by said relevant word information choosing means and said word-to-word relationship information stored in said word-to-word relationship information storing means.

14. The document retrieving apparatus in accordance with claim 7, wherein said retrieval condition producing means produces said document retrieval conditions based on all of said new word selection result produced by said word selection result comparing means, said first word selection result chosen by said first word choosing means, and said second word selection result chosen by said second word choosing means.

15. A document retrieving method for performing a document search based on sound including voice, said document retrieving method comprising:

a step of converting a sound into an electric signal and generating a character pattern data;

a step of choosing an estimated word to be involved in said character pattern data, as a word selection result based on likelihood information which determines the likelihood of a word recognized from said character pattern data;

a step of producing additional information to be added to said word selection result so as to reflect the result of repetitive retrieval operations;

a step of producing document retrieval conditions based on both of said word selection result and said additional information; and a step of retrieving documents based on said document retrieval conditions.

16. A document retrieving method for performing a document search based on sound including voice, said document retrieving method comprising:

a step of converting a first sound of a first user into an electric signal and generating a first character pattern data;

a step of choosing an estimated word to be involved in said first character pattern data, as a first word selection result based on likelihood information which determines the likelihood of a word recognized from said first character patter data;

a step of converting a second sound of a second user into an electric signal and generating a second character pattern data;

a step of choosing an estimated word to be involved in said second character pattern data, as a second word selection result based on likelihood information which determines the likelihood of a word recognized from said second character pattern data;

a step of comparing said first word selection result obtained from said first user with said second word selection result obtained from said second user to produce a new word selection result;

a step of producing document retrieval conditions based on said new word selection result, and a step of retrieving documents based on said document retrieval conditions, thereby realizing a retrieval operation based on cooperation between said first user and said second user.

* * * * *

UNITED STATES PATENT AND TRADEMARK OFFICE
CERTIFICATE OF CORRECTION

PATENT NO. : 6,622,122 B1
DATED : September 16, 2003
INVENTOR(S) : Yoshio Fukushige et al.

It is certified that error appears in the above-identified patent and that said Letters Patent is hereby corrected as shown below:

Column 28,
Line 49, delete "imformation" and insert therefor -- information --.

Signed and Sealed this

Third Day of February, 2004

JON W. DUDAS
*Acting Director of the United States Patent and Trademark Office*